United States Patent [19]

Hirotsu et al.

[11] Patent Number: 5,071,461
[45] Date of Patent: Dec. 10, 1991

[54] METHOD AND APPARATUS FOR BENDING OVERLAPPING GLASS PLATES TO FORM A LAMINATED GLASS STRUCTURE

[75] Inventors: Takashi Hirotsu; Yukiyasu Mori; Kenji Maeda; Hiroshi Tsuji; Tatsuo Sugiyama, all of Yokohama, Japan

[73] Assignee: Asahi Glass Company, Ltd., Tokyo, Japan

[21] Appl. No.: 380,080

[22] Filed: Jul. 14, 1989

[30] Foreign Application Priority Data

Jul. 18, 1988 [JP] Japan ............................ 63-178553
Jul. 29, 1988 [JP] Japan ............................ 63-187977

[51] Int. Cl.$^5$ ............................................. C03B 23/023
[52] U.S. Cl. ................................................ 65/104; 65/106; 65/107; 65/268; 65/273
[58] Field of Search ................ 65/104, 106, 107, 273, 65/289, 290, 348, 349, 268

[56] References Cited

U.S. PATENT DOCUMENTS

| 2,957,277 | 10/1960 | White | 65/273 |
| 3,001,328 | 9/1961 | Berseth | 65/268 |
| 3,129,088 | 4/1964 | Ritter | 65/260 |
| 3,248,195 | 4/1966 | Golightly | 65/107 |
| 3,682,613 | 8/1972 | Johnson | 65/289 |
| 3,762,902 | 10/1973 | Wagner | 65/60 |
| 4,229,201 | 10/1980 | Comperatore | 65/287 |
| 4,265,650 | 5/1981 | Reese | 65/104 |
| 4,609,391 | 9/1986 | McMaster | 65/104 |
| 4,749,399 | 6/1988 | Yamada et al. | 65/273 |
| 4,756,735 | 7/1988 | Cathers | 65/106 |
| 4,778,507 | 10/1988 | Aruga et al. | 65/106 |

FOREIGN PATENT DOCUMENTS 0183418 6/1986 European Pat. Off. .
2359795 2/1978 France .

Primary Examiner—Joye L. Woodard
Attorney, Agent, or Firm—Oblon, Spivak, McClelland, Maier & Neustadt

[57] ABSTRACT

Glass plates for a laminated glass are bent and strengthened by provisionally shaping by heating two overlapping glass plates placed on a deadweight bending mold having a shaping surface by elevating the temperature to a temperature capable of bending glass and by locally heating said portions of the two overlapping glass plates to be deeply bent at a higher temperature in a heating/pressing stage so that the two overlapping glass plates are provisionally shaped by their own deadweight into a shape substantially corresponding to the shape of the shaping surface of the bending mold, pressing a portion of the two overlapping glass plates to be deeply bent from the top by a pressing member after the provisional shaping step in a heating/pressing stage, separating the two overlapping glass plates from the bending mold by pushing up the portion of the glass plates other than the deeply bent peripheral portion of the two overlapping glass plates thereby cooling the peripheral portion of the glass plates in a peripheral portion strengthening stage, and cooling the overlapping glass plates to atmospheric temperature.

15 Claims, 25 Drawing Sheets

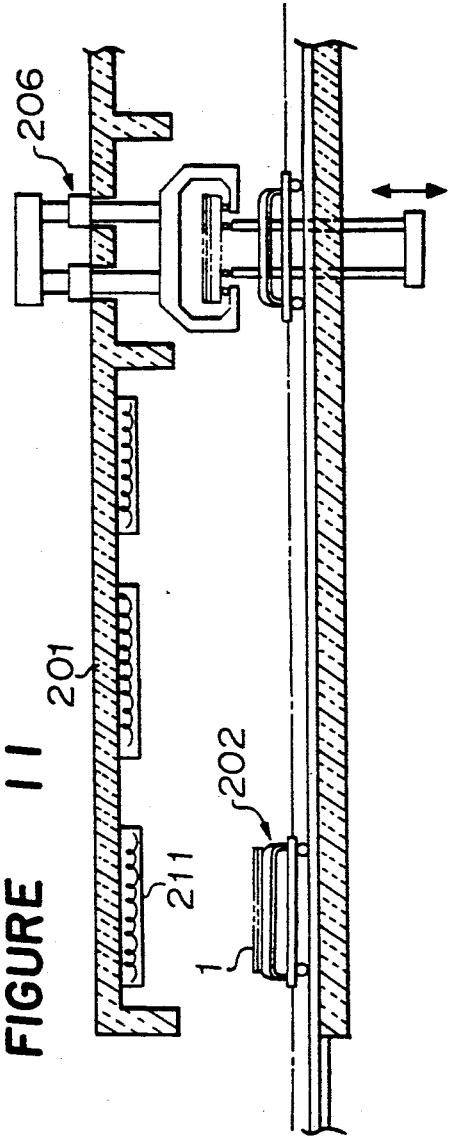
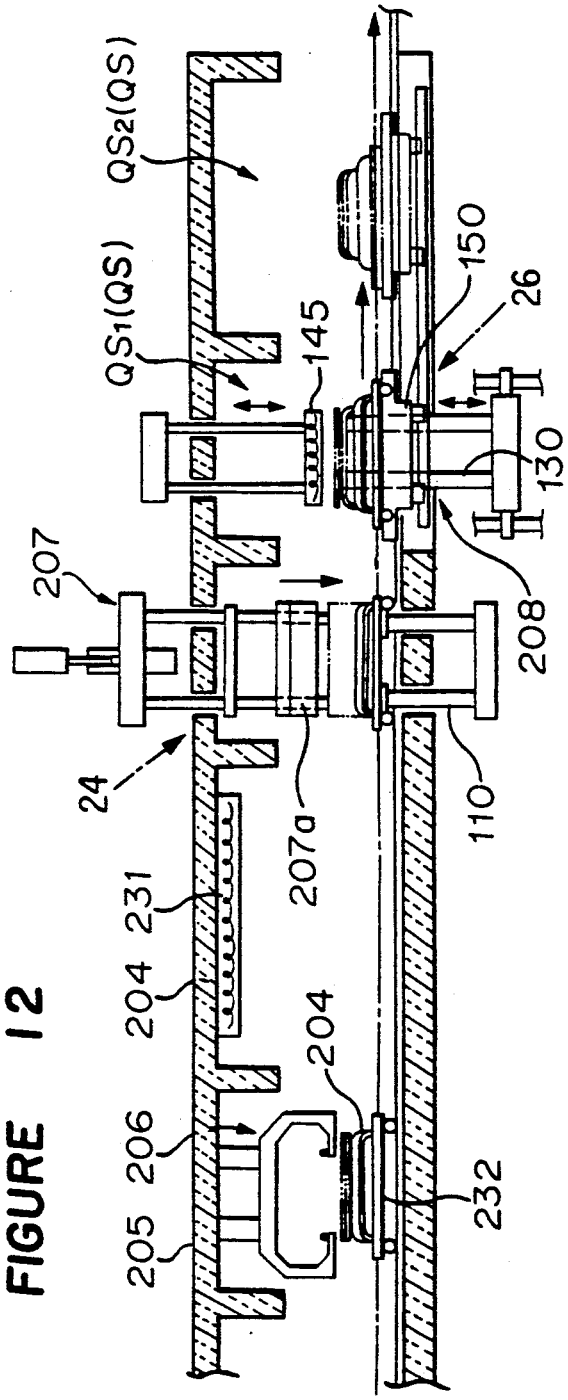

FIGURE 33a
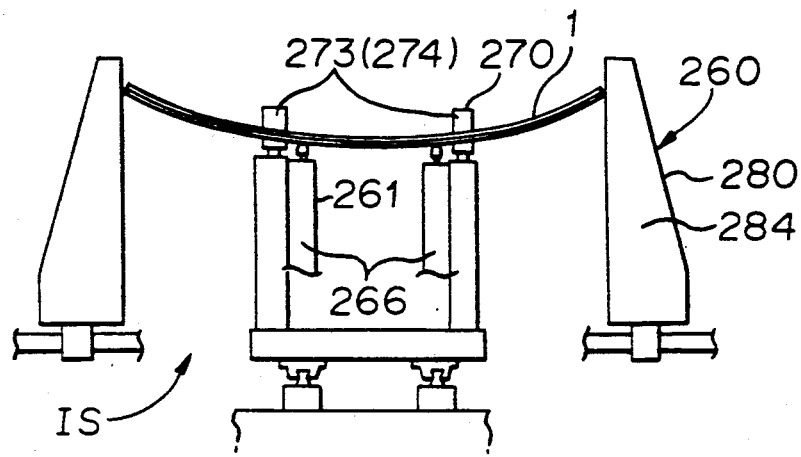
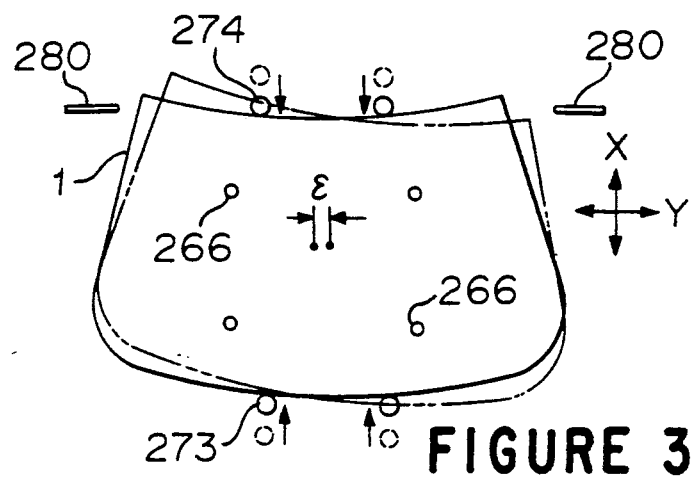
FIGURE 33b
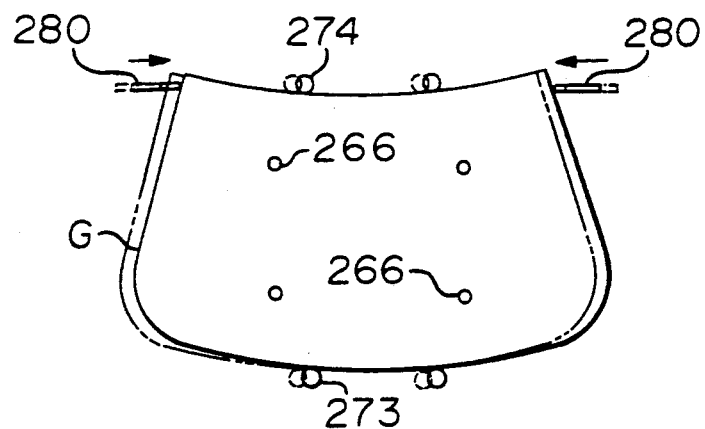
FIGURE 33c

METHOD AND APPARATUS FOR BENDING OVERLAPPING GLASS PLATES TO FORM A LAMINATED GLASS STRUCTURE

BACKGROUND OF THE INVENTION

1. Field of the Invention

The present invention relates to a method of and an apparatus for bending two overlapping glass plates simultaneously. Particularly, the present invention relates to a method of and apparatus for bending two overlapping glass plates which is suitable for deep-bending a side portion of the overlapping glass plates.

2. Description of the Background

A laminated glass is formed by laminating two glass plates and an intermediate plastic film such as polyvinyl butyral as an interlayer, and it is widely used for a front glass as a wind-shielding window for an automobile from the standpoint of safety.

In such laminated glass of this kind, it is necessary to bend two flat glass plates to thereby form a laminated glass because a curved laminated glass having the two-dimensional curved surface or the three-dimensional curved surface is required from the viewpoint of excellent design for automobiles. In this case, when the glass plates are separately bent, a delicate difference in shape appears between the glass plates to be laminated. Accordingly, when they are laminated with the intermediate layer interposed therebetween, such disadvantages as the failure to obtain a complete joint between the two glass plates, and the presence of air bubbles at the bonding surfaces which causes peeling off of the laminated glass result. Accordingly, a method of bending simultaneously two overlapping glass plates has been used for manufacturing laminated glass.

As a conventional method of bending glass plates for a laminated glass, there has been known a method in which a bending mold having a bend-shaping surface corresponding to a curved surface of the laminated glass is prepared; two glass plates are placed on the bending mold in an overlapping state; the bending mold is transferred into a heating furnace together with the glass plates; the glass plates are heated to a temperature capable of softening glass so that the glass plates are bent by their own deadweight as the glass plates are softened, whereby the glass plates are bent so as to correspond to the bend-shaping surface of the bending mold (Japanese Examined Patent Publication No. 10332/1974).

In such method, when it is necessary to deeply bend a side portion of the laminated glass, a bending mold having a fixed split mold in a ring form which has a bend-shaping surface corresponding to a generally curved portion (a gently curved portion) of the laminated glass and a movable split mold in a ring form which is placed at a side (or both sides) of the fixed split mold so that it can move to the fixed mold so as to be in alignment with the fixed mold by its own deadweight, and which has a bend-shaping surface corresponding to a portion to be deeply bent of a side portion of the laminated glass, is used. Two glass plates in a flat form are placed in an overlapping state on the bending mold with the movable split mold (molds) in a developed state; the bending mold is transferred into a heating furnace along with the glass plates; the glass plates are heated to a temperature capable of softening the glass plates; and as the glass plates are softened, the movable split mold is moved so as to come in alignment with the fixed mold, whereby the side portion of the glass plates is deeply bent by their deadweight by means of the movable split mold (Japanese Examined Patent Publication No. 1210/1973).

Recently, the demands of reducing the weight of an automobile and assuring the safety to passengers at the time of collision have been increasing, and a thin glass plate having a thickness of about 1.8 mm-2.5 mm has been used for a laminated glass which is used as a front windshield.

Moreover, a fitting structure called a flush mount system wherein a glass plate such as a front glass is fitted to the window frame of an automobile so that the surface of the car body in the vicinity of the window is substantially flush with the surface of the glass plate has been widely used. For the glass plate in the flush mount system, a high level of performance or quality such as strength is required from the standpoint of safety.

In view of the necessity of increasing the strength when the glass plates for a laminated glass are to be bent, it is necessary to cool the peripheral portion of the laminated glass at a predetermined cooling rate so that a compressive stress layer is formed at the peripheral portion of the laminated glass which is prepared by bending the glass plates in a softened state by applying heat. A technique which has been utilized along these lines involves placing glass plates on a bending mold so that the circumferential portion of the glass plates slightly projects from the bending mold; a deadweight bending method is carried out for the glass plates in a heating furnace, and the glass plates are introduced in a gradually cooling furnace to cool them at a predetermined cooling rate, whereby a requisite compressive stress layer is formed at the peripheral portion of the laminated glass plates.

However, when the thin glass plates as described above were bent by using the conventional bending method, the following problems occured. Namely, the glass plates were placed on the ring frame of the bending mold through its peripheral portion, and accordingly, it was difficult to sufficiently cool the peripheral portion of the glass plates in a gradually cooling furnace because the peripheral portions were in contact with the ring frame having a high thermal capacity. It was therefore, impossible to form a compressive stress layer in the peripheral portion of the glass plates, and a desired strengthening treatment could not be applied to the peripheral portion of the glass plates.

In order to eliminate the above-mentioned problem, a possible alternative is to apply a desired strenthening treatment to the peripheral portion in such as a manner that the peripheral portion of the glass plates projects from the ring frame of the bending mold; a bending operation is conducted under the condition that the preripheral portion is not in contact with the ring frame, and then the peripheral portion is gradually cooled. However, in the event a side portion of the glass plates is to be subjected to a deep-bending operation, it is necessary to locally press the side portion in addition to the above-mentioned bending operation. In this case, if the peripheral portion of the glass plates is projected from the ring frame of the bending mold, it is impossible to bend the glass plates into a desired shape, particularly, the peripheral portion into a desired shape.

SUMMARY OF THE INVENTION

It is an object of the present invention to provide a method of and an apparatus for bending glass plates for a laminated glass which can provide a desired strength to the peripheral portion of two overlapping glass plates.

It is another object of the present invention to provide a method of and an apparatus for bending glass plates for a laminated glass which permit deep-bending operations for a side portion of two overlapping glass plates without the necessity of a complicated post-treatment and which readily achieves a system of large scale production.

The foregoing and other objects of the present invention have been attained by providing a method of bending glass plates for a laminated glass which comprises:

provisionally shaping two overlapping glass plates on a deadweight bending mold having a shaping surface by heating them to a temperature capable of bending glass and at the same time, by locally heating side portions of the glass plates to be deeply bent at a higher temperature at a heating stage to thereby bend the glass plates by their own deadweight into a shape substantially corresponding to the shape of the shaping surface of the bending mold, press-shaping portions of the overlapping glass plates to be deeply bent from the top by a pressing means at a pressing stage, separating the two overlapping glass plates from the bending mold by pushing up the portion other than the peripheral portion of the overlapping glass plates thereby cooling the peripheral portion of the glass plates at a peripheral portion strengthening stage, and cooling the two overlapping glass plates at atmospheric temperature.

In this case, a deadweight bending mold may be used which is provided with taper rings each having a shaping surface at its upper portion at the position corresponding to a portion of the overlapping glass plates to be deeply bent, the shaping surface having the shape corresponding to that of a side portion of the overlapping glass plates.

Either one of the overlapping glass plates may be provided with a color-printed ceramic color frit layer at at least a portion to be deeply bent of a side of the glass plate.

A gradual cooling step to the laminated glass plates after the press-shaping operations is preferably carried out by drawing the glass plates from a peripheral portion strengthening stage to a gradual cooling stage at a drawing speed higher than the ordinary drawing speed. In this case, it is desirable that the laminated glass plates are drawn after the peripheral portion of them has been locally heated.

In accordance with the apparatus for bending glass plates for a laminated glass of the present invention, it comprises a deadweight bending mold having a first bend-shaping surface corresponding to an intermediate curved portion of two overlapping glass plates and a second bend-shaping surface corresponding to a portion of the glass plates to be deeply bent, a pressing means which is disposed at a position above the bending mold and in correspondence to a portion of the laminated glass plates to be deeply bent and which is provided with a vertically movable means to push the portion of the laminated glass plates to be deeply bent on the bending mold, and a raising means disposed inside the bending mold so that the laminated glass plates having been subjected to the deeply bending operation is raised upwardly.

The bending mold may be constituted of a split type deadweight bending mold for provisional bending and a non-split type regular bending mold arranged near the bending mold. Further, a local heating means may be provided to locally heat the peripheral portion of the laminated glass plates after the pressing operation by the pressing means has been completed.

When the bending mold is constituted of the split type deadweight bending mold for provisional bending and the non-split type regular bending mold disposed near the provisional bending mold, the bending operation to the two overlapping glass plates is carried out by using a method of bending glass plates for a laminated glass which comprises provisionally shaping two overlapping glass plates on a splittable type deadweight provisional bending mold with fixed and movable molds each having a shaping surface by heating them to a temperature capable of bending glass and at the same time, by locally heating side portions of the glass plates to be deeply bent at higher temperature to thereby bend the glass plates by their own deadweight into a shape substantially corresponding to the shape of the shaping surface of the bending mold, moving the two overlapping glass plates from the splittable type binding mold to a non-splittable type regular bending mold, pressing portions of the overlapping glass plates to be deeply bent from the top by a pressing means, separating the two overlapping glass plates from the bending mold by pushing up the portion other than the peripheral portion of the overlapping glass plates to thereby cool the peripheral portion of the glass plates, and cooling the two overlapping glass plates at atmospheric temperature.

An example of a bending mold constituted by the split type deadweight bending mold and the non-split type bending mold, is an apparatus for bending glass, plates for a laminated glass, wherein side portions of two overlapping glass plates are simultaneously subjected to deep bending, the apparatus being characterized by comprising a first heating furnace for provisionally bending which is adapted to heat the glass plates to a glass temperature capable of bending glass, a provisional bending mold arranged in the first heating furnace in a movable manner, which is provided with a fixed mold having a bend-shaping surface which corresponds to an intermediate curved portion of the glass plates and a movable mold having a bend-shaping surface which corresponds to a portion of the glass plates to be deeply bent, the movable mold being movable in a manner to come in alignment with an end of the fixed mold by its deadweight when the two overlapping glass plates held on the fixed and movable molds are heated to said temperature, a second heating furnace for regular bending which is adapted to heat the glass plates to a temperature capable of bending glass, a regular bending mold arranged in the second heating furnace in a movable manner and having a bend-shaping surface which corresponds to a portion to be bent of the glass plates, a transferring furnace which communicates with both the first and second heating furnaces and which provides a temperature condition that the shape of the glass plates which have been provisionally shaped in the first heating furnace is kept, a transferring means arranged in said transferring furnace and being adapted to transfer the provisionally shaped glass plates from the provisional bending mold to the regular bending mold, a pressing means which is arranged in a pressing stage in the second heating furnace and which has a pressing member having a curved surface which corresponds to a portion to be deeply bent of the glass plates so that the pressing member pushes the deeply bent portion of the glass plates to the regular bending mold in the pressing stage, and a raising means arranged inside the regular bending mold in order to raise the glass plates after the deep bending operation is finished.

In the above-mentioned apparatus, a separating and holding means may be provided instead of the raising means.

With respect to the construction of a furnace in which a heating/pressing stage is provided to bend the two overlapping glass plates, it can be modified as desired as long as the furnace has means for heating the glass plates to a temperature which is capable of softening glass and for deep-bending a portion of the softened glass plates by a pressing means. In this case, it is preferred that the side portion of the glass plates to be deeply bent is heated at a higher temperature than the other portion at the heating stage in order to achieve good processability. In order to heat a local portion of the glass plates, it is preferred to arrange at least one heater at the upper or lower side or both sides of the glass plates to be deeply bent.

As to the raising means to separate the two overlapping glass plates from the bending mold after the bending operation has been finished, the raising means is preferably arranged in the peripheral portion strengthening stage. Alternately, it can be integrally formed at a suitable position in a base truck which functions a transferring means for the bending mold.

The construction of the gradual cooling stage for strengthening the peripheral portion of the two overlapping glass plates after having been bent may be modified as desired as long as it can cool the peripheral portion of the glass plates to form a desired compression stress layer in it. In this case, it is preferable to provide a quickly drawing means which is capable of quickly drawing the glass plates along with the bending mold from the peripheral portion strengthening stage to the gradually cooling stage. In this case, in order to strengthen the peripheral portion of the glass plates, the glass plates are quickly drawn to a low atmospheric temperature region at a peripheral portion strengthening stage in which there is temperature difference to thereby cool the peripheral portion, or the peripheral portions quickly cooled by blowing cool air.

The term "quickly cooling" referred to in this specification does not imply a technique of quickly cooling a glass plate to obtain a strengthened glass plate as described in JIS (Japanese Industrial Standard) wherein the glass plate has at its entire surface a compressive stress layer of about 1,000 kg/cm$^2$–1,700 kg/cm$^2$, but implies a cooling rate of about 80° C./min–300° C./min which is farely lower than the cooling rate in the JIS. By cooling the glass plates at the above-mentioned cooling rate, glass plates are obtained which have a plane compressive stress layer of about 150 kg/cm$^2$–500 kg/cm$^2$ is formed only in the peripheral portion of the glass plates, which are desirably used as a laminated glass.

As to the deadweight bending mold, the design of the bending mold may be changed as desired so long as the bending mold is split into a fixed split mold and movable split molds which are made of a heat resistant material durable to a temperature for shaping (about 600° C.–750° C.) in the heating furnace. The fixed split mold and the movable split molds may be so formed as to have shaping surfaces corresponding to the shape of the glass plates, or ring-like shaping surfaces which support the peripheral portion of the glass plates. In such construction of the shaping surfaces, the molds having the ring-like shaping surface are preferably used from the viewpoint that the surface of the glass plates can be smooth; a trace of the mold can be minimized; the glass plates can be uniformly heated; and the contacting area of the surface of the glass plates to the bending molds has to be minimized as possible so as to reduce loss of heat capacity. Further, a desired design may be applied to the movable split molds so long as they come to in alignment with the fixed split mold by their own deadweight. In addition, the returning movement of the movable split molds to their set position can be adjusted by changing the structure of the movable split molds or by attaching a balance weight.

Means for transferring the bending mold may be so constructed that a base truck can be moved along a predetermined circulating passage or linear passage, or a continuous conveying means formed by transferring rollers or a transferring belt made of a heat resistant material. In this case, a mechanically operated position-determining means has to be provided at a bending stage or the transferring means is subjected to position control by means of a control system because the bending mold has to be stopped at the bending stage. A number of bending molds may be used in order to increase productivity.

The design of the pressing means may be changed as desired so long as it exerts a pressing force to a side portion of the glass plates to be deeply bent to the bending mold at the pressing stage without causing any interference with the bending mold when the bending mold reaches the pressing stage. In this case, in order to effectively suppress occurrence of wrinkles at the side portion of the glass plates, it is preferable that a pressing member can push the side portion of the glass plates from the direction substantially perpendicular to the shaping surface for deep bending in the bending mold. The pressing member is preferably provided at the side of the transferring means in the bending mold from the standpoint that a relative positional relation to the bending mold can be easily obtained. Or, the pressing member is preferably disposed at a suitable position in the pressing stage in by considering that a number of regularly bending molds are used, thermal efficiency in the heating furnace can be increased for a regular bending operation, and the heat resistance properties of a supporting mechanism to the pressing member have to be increased. The pressing member may be so formed as to correspond to the entire portion of the glass plates to be deeply bent. However, it may be so formed that it has a portion corresponding to a portion having a large radius of curvature of the glass plates. The portion having a large radius of curvature has been difficult to correctly shape in the provisionally bending furnace by the conventional technique. When the portion to be deeply bent is formed by several sections having different radii of curvature, a pressing member having pressing surfaces having different radii of curvature corresponding to the curved surface is used.

When the bending mold is constituted by the split type deadweight bending mold and the non-split type bending mold disposed adjacent the split type deadweight bending mold, a desired change of design may be made as to the non-split type bending mold so long as it is formed by a heat resistant material durable to a temperature of 600° C.-750° C. in the regular bending heating furnace and it has a bend-shaping surface which does not cause deformation. In this case, the construction of a regular bending mold transferring means and a position determining means may be suitably designed in the same manner as the provisional bending mold transferring means. And, the number of these elements can be selected. The construction of a transferring furnace in which the glass plates are transferred from the provisional bending mold to the regular bending mold may be changed as desired so long as transferring operations of the two overlapping glass plates provisionally shaped in the heating furnace can be effected smoothly. However, from the viewpoint of minimizing a heat loss in the glass plates, it is preferable to maintain atmospheric temperature as far as the shape of the two overlapping glass plates can be kept as they are.

The transferring means may be of such a type that the glass plates provisionally shaped are transferred from the provisional bending mold to the regular bending mold in the transferring furnace, and the provisional bending mold and the regular bending mold are respectively moved to different stages in the transferring furnace. In this case, the two glass plates are moved while they are raised from the provisional bending mold; the position-alignment of the glass plates are conducted during the movement of the glass plates or at a fixed position of the regular bending mold, and then, the glass plates are placed on the regular bending mold. Or, the two glass plates provisionally shaped are raised from the provisional bending mold and are held temporarily at a transferring stage from the provisional bending mold in the transferring furnace; the provisional bending mold and the regular bending mold are interchanged at the same stage, and then, the glass plates are placed on the regular bending mold. It is preferable to take the formerly mentioned measures from the viewpoint that the design of the transferring means for the provisional bending mold and the regular bending mold can be easy. Further, it is preferable to take lately mentioned measures from the viewpoint that the position-aligning operations for the glass plates can be easy.

In accordance with the above-mentioned technique, the two glass plates for a laminated glass placed on the bending mold are heated to a temperature capable of softening glass at the first stage of the heating/bending stage in the heating furnace so that they are subjected to the provisional shaping operation to have a shape generally in compliance with the bending mold, and then, an incompletely shaped portion of the provisionally shaped two glass plates, especially, the portion of the glass plates to be deeply bent are subjected locally to a pressing operation, which portion corresponds to the deep-bending portion of the bending mold at the second state of the heat/bending stage in the furnace. Then, the two overlapping glass plates press-shaped are separated from the bending mold by means of the raising means, and they are moved to the gradual cooling stage where they are cooled at a predetermined cooling rate, whereby a compression stress layer can be effectively formed in the peripheral portion of the glass plates. Thus, a compressive stress layer of about 150 kg/cm$^2$-600 kg/cm$^2$ which is practically required for the peripheral portion of the laminated glass can be obtained.

BRIEF DESCRIPTION OF THE DRAWINGS

FIG. 5 is a plane view showing a positional relationship of the split type bending mold to the raising means;

FIG. 6 is an enlarged view of an important part in FIG. 5 which shows a supporting member in the raising means;

FIG. 7 is a cross-sectional view taken along a line 7—7 in FIG. 6;

FIGS. 11 to 13 are respectively cross-sectional views taken along lines 11—11, 12—12 and 13—13 in FIG. 10;

FIG. 33a is a diagram showing a position aligning step in the transferring process;

FIGS. 33b and 33c are respectively diagrams which show steps of position aligning;

DESCRIPTION OF THE PREFERRED EMBODIMENTS

Figure 1:
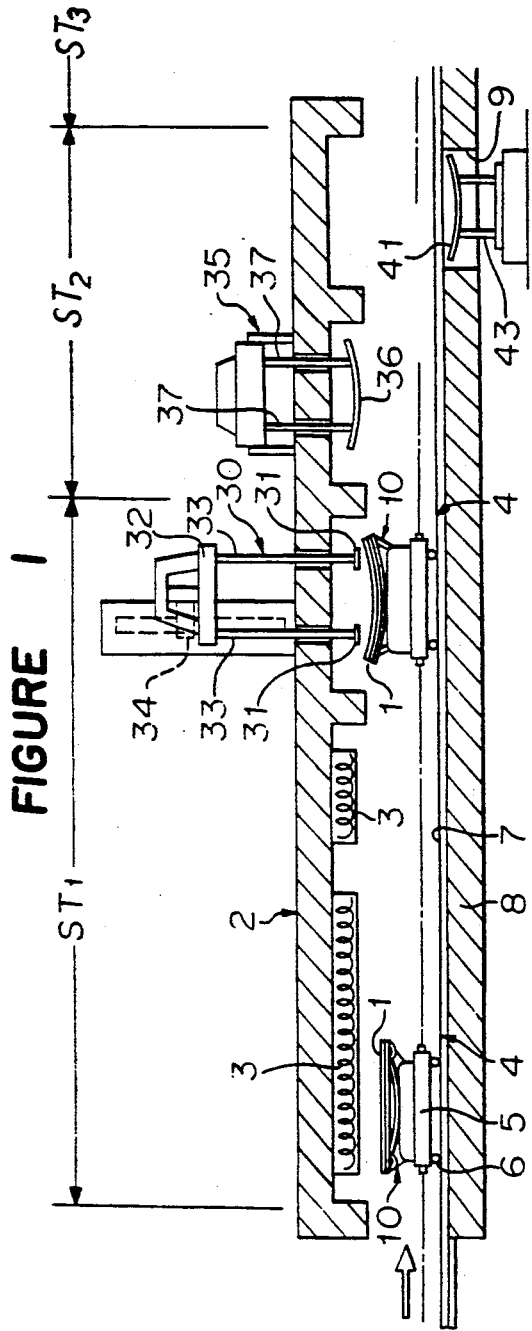
FIG. 1 is a diagram showing a system of bend-shaping glass plates for a laminated glass in which an embodiment of the apparatus for bending the glass plates according to the present invention is incorporated.

FIG. 1 is a diagram showing a system for bend-shaping and strengthening glass plates for a laminated glass to which the present invention for deep-bending both side portions of the glass plates is applied.

Two glass plates 1 are placed in an overlapping state on a deadweight bending mold 10 which is placed on a base truck 5. The base truck 5 is moved in a furnace 2 by means of, for instance, a transferring means 4 having a suitable construction such as a chain conveyor and supporting bars for supporting the chain conveyor 6. A bending operation is applied to the glass plates while the base truck is passed through a heating/pressing stage $ST_1$ in which a heating/bending operation for provisionally shaping and a pressing operation for deeply bending a portion of the glass plates are carried out. After such bending operation is carried out, the two overlapping glass plates 1 are transferred to a peripheral portion strengthening stage $ST_2$ formed at the next stage along with the bending mold 10 by means of the transferring means 4, and at the peripheral portion strengthening stage $ST_2$, a local heating treatment is applied to the peripheral portion of the overlapping glass plates 1 which have been subjected to the bending operations.

Then, the glass plates are transferred into a gradual cooling stages $ST_3$ after a predetermined peripheral portion strengthening treatment is applied to the peripheral portion of the glass plates. Thereafter, the glass plates are transferred from the gradual cooling stage $ST_3$ to the outside of the furnace 2 to be cooled.

In this case, at the heating stage in the front part of the heating/pressing stage $ST_1$, the glass plates 1 are softened by heating them at a temperature (e.g. 550° C.–650° C.) capable of softening glass by means of heaters 3 provided in the furnace 2 whereby the glass plates are bent so as to substantially meet the shaping surface of the bending mold 10; thus, a provisional shaping operation is completed.

At pressing stage in the rear part of the heating/pressing stage $ST_1$, a locally press-shaping operation is conducted to a completely shaped portion, i.e. a portion of the overlapping glass plates 1 to be deeply bent by means of a pressing means 30.

After the local pressing operation has been finished, the glass plates 1 are transferred to the peripheral portion strengthening stage $ST_2$ where the peripheral portion of the glass plates 1 is locally heated by means of a local heating means 35 placed in the vicinity of the peripheral portion of the glass plates. The purpose of conducting the local heating is to raise the temperature at the time of starting a cooling operation when the peripheral portion of the glass plates 1 is to be subjected to a strengthening treatment, whereby a sufficient gradient of temperature for cooling is obtainable and a greater compressive stress layer is formed at the peripheral portion.

At the rear part of the peripheral portion strengthening stage $ST_2$, the overlapping glass plates 1 which have been press-shaped and locally heated at the front part of the peripheral portion strengthening stage $ST_2$ are subjected to the peripheral portion strengthening operation by forming a compressive stress layer in the peripheral portion. Then, the overlapping glass plates 1 are raised above the bending mold 10 by means of a raising means 40 which supports the portion except for the peripheral portion of the glass plates 1 so as not to cause undesired strain in the overlapping glass plates 1, and the overlapping glass plates are moved at a predetermined rate or are stopped there for a predetermined time so that they are gradually cooled at the gradually cooling stage $ST_3$.

The, the two overlapping glass plates are transferred from the gradual cooling stage $ST_3$ to the outside of the furnace 2 whereby they are cooled at atmospheric temperature.

The deadweight bending mold 10 on which the two overlapping glass plates 1 are placed is preferably so constructed that it is made of a heat resistant material which is durable to a temperature of 580° C.–700° C. for shaping glass in the furnace 2 and has a bent-shaping surface which corresponds to an intermediate curved portion of the glass plates to be shaped and a bent-shaping surface which corresponding to a portion to be deeply bent. In such bending mold 10, a ring-like frame is used to support the peripheral portion of the overlapping glass plates 1. For the deadweight bending mold 10, a fixed type bending mold having a desired shaping surface, i.e. a non-split type bending mold or a split type bending mold having a fixed mold and movable molds may be used.

Figure 2:
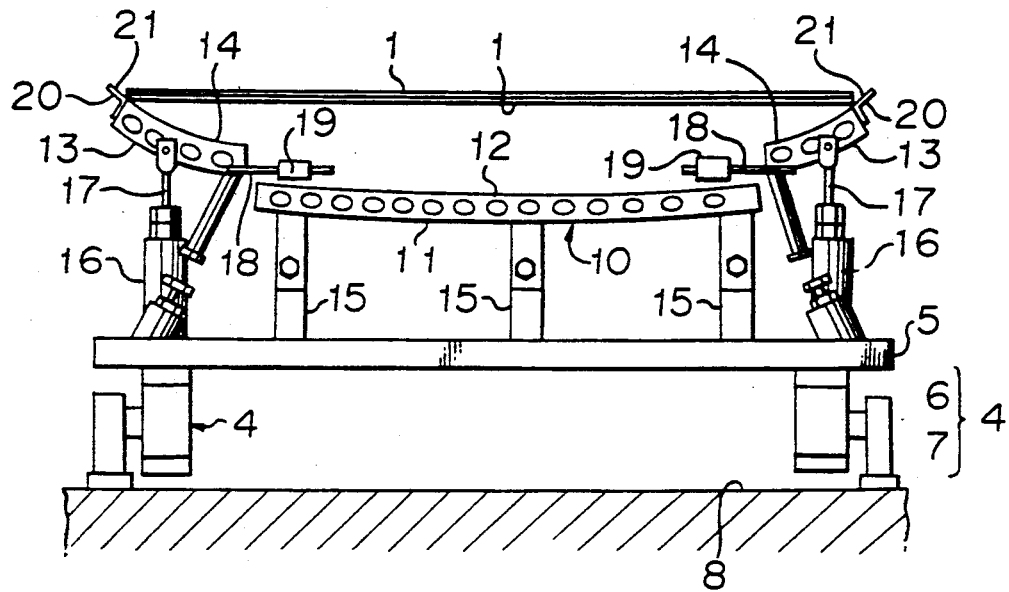
FIGS. 2 and 3 are respectively diagrams showing processing steps of bending the glass plates for a laminated glass with use of a split type bending mold according to the present invention.

FIG. 2 shows a split type deadweight bending mold 10. The split type bending mold 10 is mounted on the base truck 5 which constitutes a transferring means 4. The bending mold 10 comprises a ring-like fixed mold 11 having a bent-shaping surface 12 which corresponds to the intermediate curved portion excluding both side portions of the overlapping glass plates 1 deeply bent and ring-like movable molds 13 each having a bent-shaping surface 14 which corresponds to a portion of the glass plates 1 to be deeply bent, the bent-shaping surface 14 coming in alignment with the bent-shaping surface 12 of the fixed mold 11 when the deep bending operation is carried out. The fixed mold 11 is fixed to the base truck 5 by means of supporting bars 15, and both side portions in the width direction of each of the movable molds 13 are respectively pivoted at the free end of the supporting bars 17 provided on the fixed brackets 16 of the base truck 5 so as to be swingable. Further, a balance weight 19 is attached to the supporting portion of each of the movable molds 13 by means of a moment arm 18 in order so that it may move to a position in alignment with the fixed mold 11 when the glass plates 1 are deeply bent.

Figure 3:
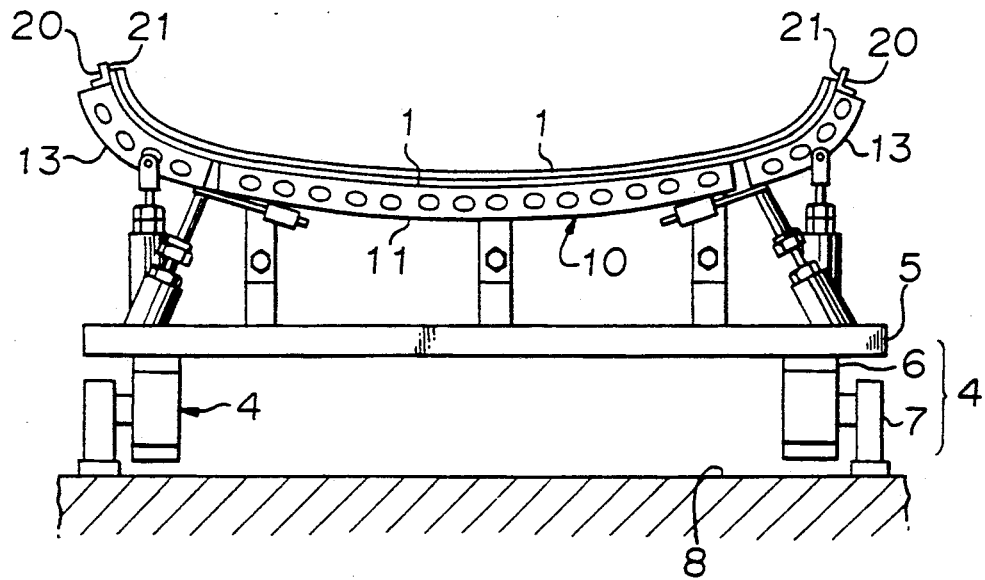

FIG. 2 shows the deadweight bending mold 10 on which two flat glass plates 1 are placed in an overlapping state before they are subjected to the heating operation, and FIG. 3 shows the bending mold 10 and the overlapping glass plates 1 after the bending operation.

Figure 4:
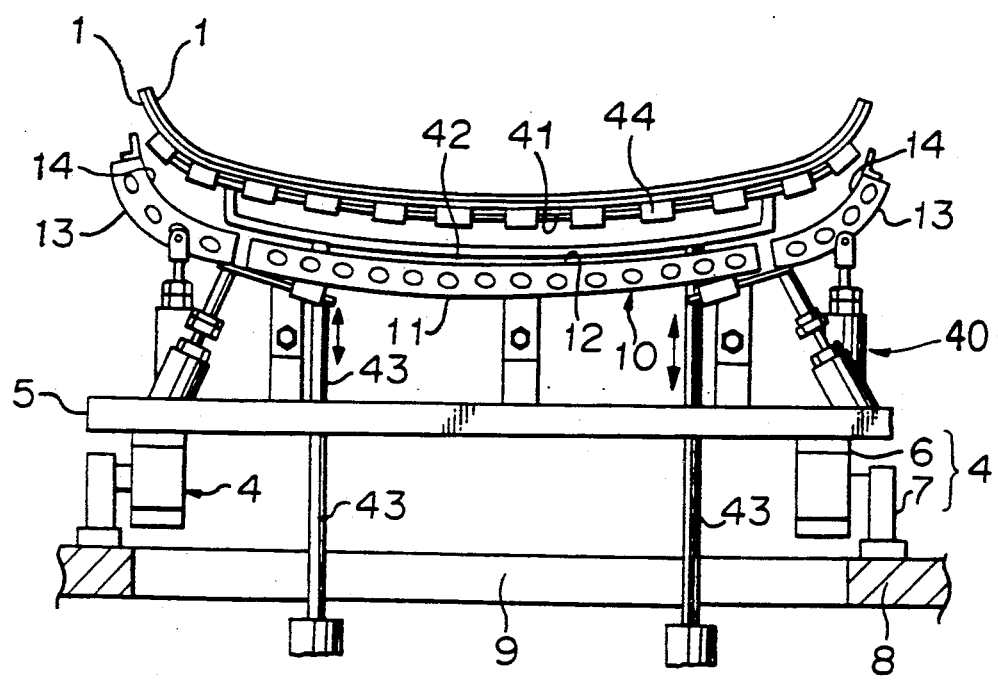
FIG. 4 is a side view showing a state in which the glass plates are raised by means of a raising means.

FIG. 4 shows a state that the glass plates are raised by the raising means 40 over the bending mold 10 after the bending operation has been finished. FIG. 5 is a plane view showing the positional relationship between the split type bending mold 10 and supporting members 41 which constitute the raising means 40.

The construction of the movable molds 13 may be changed in design as desired so long as they can move in the direction capable of aligning with the fixed mold 11 because of the deadweight of the glass plates 1 and to stop at a position in alignment with the fixed mold. In this case, the movement of the movable molds 13 may be adjusted by changing the design of them or by using an appropriate weight means 19.

A taper ring 20 is preferably attached to each of the movable molds 13 which correspond to the portions of the glass plates 1 to be deeply bent, or both sides of the fixed mold in case of the bending mold is of a non-split type so that the taper rings 20 respectively project from the both end portions of the bending mold 10 as shown in FIG. 2. For the taper rings 20, the edge portions of the bending mold 10 may extend outwardly so as to function as the taper rings 20. The contacting surface of the taper ring 20 or the extensions extending from the end portions of the bending mold, which come in contact with the lower surface of the side portion of the glass plates constitutes a shaping surface 21 which corresponds to a curved shape of the final product of the laminated glass so that the end portions of the glass plates can be supported in order to provide a desired shape during the press-shaping operation. Accordingly, when the provisional shaping operation by the deadweight of the glass plates 1 on the bending mold 10 is carried out, only the end portions of the glass plates 10 are in contact with the supporting surface of the taper ring or the extensions, and a gap remains between the lower surface of the glass plate 1 and the shaping surface 21 of the extensions or the taper ring 20. Accordingly, a trace which is caused by the contact of the mold is prevented from occuring at the inside of the edge portion of the lower surface of the lower glass plates during the provisional shaping operation. Thus, by pressing the peripheral portion of the glass plates 1 by means of the pressing means 30, a desired shape is obtainable so that the shaping surface 21 of the taper ring 20 corresponds to the bend shaping surface 14 at the end portion of the bending mold. The taper rings 20 or the extensions (not shown) provided at the edge portions of the bending mold 10, which perform the above-mentioned function, are only sufficient to provide at least appropriate portions of the bending mold, and it is not always necessary to the same in the entire region of the side portions of the bending mold.

In case of press-forming the deep-bent portion of the glass plates 1 by means of the pressing means 30 and the split type bending mold 10, it is desirable to provide a stopper so that the jumping of the movable mold 13 can be prevented at the time of press-shaping of the deep-bend portion of the glass plates 1.

As shown in FIG. 1, the pressing means 30 has a pressing member disposed at a position above the portion to be deeply bent of the provisional shaped glass plates 1 placed on the bending mold 10, and the pressing member 31 is attached to a pressing base 32 by means of support arms 33. The pressing base 32 is so adapted that it moves vertically in response to the movement of a pressing cylinder 34 wherein when the pressing cylinder descends, the deep-bend portion of the glass plates is press-shaped by the pressing member 31, and when the pressing cylinder 34 ascends, a pressing operation on the deep-bent portion of the glass plates 1 by the pressing member 31 is cancelled.

When the pressing means 30 presses the deeply-bent portion of the glass plates 1, it is preferred to exert a pressing force in the direction perpendicular to the glass plates 1 at its contacting portion so that generation of wrinkles, scars or traces on the glass plates can be reduced.

It is preferred that the pressing member 31 be coated with heat insulating cloth such as glass fibers, silica fibers, ceramic fibers, metallic fibers and so on in order to prevent a trace by the bending mold from forming on the contacting surface of the glass plate when the pressing operation is conducted.

It is preferred that local heating heaters (not shown) are provided above and/or below the portions of the glass plates to be deeply bent so as to allow the bending operation to the deeply-bent portion easily when the glass plates are bent by their own deadweight on the split type bending mold 10. In this case, the deep-bent portion of the glass plates is heated at a temperature of, for instance, 10° C.–100° C. higher than that for the other portions, whereby the bending operation by the deadweight can be easy. The shape of the local heating heaters is determined depending on the shape of the deep-bend portion of the glass plates, and it may be in a linear form extending in the longitudinal direction, or in a curved form so as to correspond to the shape of the deeply-bent portion, or in a complicated form.

In the method of the present invention, a colored zone may be formed by a color-printed ceramic color frit at the circumferential portion of the glass plates 1 which includes the portion to be deeply bent by the pressing means 30. Since the printed layer is formed by the color frit of colored ceramics at the portion to be press-shaped by baking it on the surface of the glass plate in the heating process before the press-shaping operation, the scar or trace becomes inconspicuous by the presence of the colored zone even when such scar or trace results in the colored zone of colored frit or in the circumferential portion of the glass plate in the press-shaping operation.

In the event that among the two overlapping glass plates 1, a printed layer of colored ceramic color frit is formed on the upper surface of the deeply-bent portion of the upper glass plate, the printed layer adheres on the heat resistant cloth covering the surface of the pressing member 31 which thereby shortens the lifetime of the heat resistant cloth or results in a trace on the surface of the colored zone of the colored ceramic color frit which is formed by baking. To eliminate this problem. a layer of a heat resistant mold release agent is formed by printing on the surface of the printed layer of the color frit so that good releasing properties are obtained between the colored zone of the color frit and the heat resistant cloth of the pressing member 31. Boron nitride or carbon may be used for the release agent having good heat resistant properties.

In an attempt to elongate the service life of the heat resistant cloth which is covered on the pressing member 31 or improving the pressing surface of the colored zone formed by baking the colored frit, the positions of the upper and lower glass plates are interchanged after the provision shaping operation by the deadweight bending of the two overlapping glass plates and prior to the press-shaping operation by the pressing member 31. Namely, one of the glass plates 1 having the colored zone formed by baking the colored ceramic color frit on it supper surface is placed below the other glass plate. Then, the peripheral portion of the upper glass plates 1 is press-shaped, whereby the colored ceramic color ink is prevented from adhereing on the heat resistant cloth, and the pressing surface of the glass plates can be improved.

Figure 8:
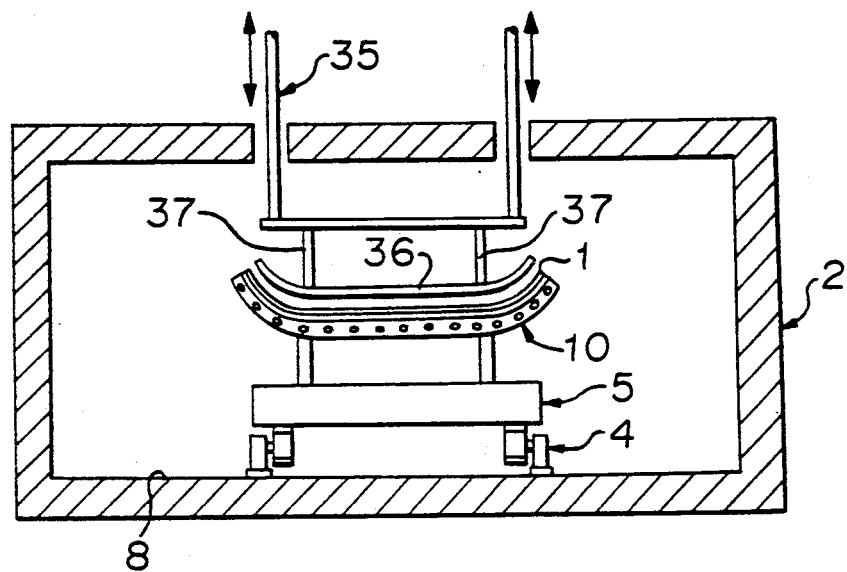
FIG. 8 is a diagram showing an embodiment of a locally heating means.

At the next stage of the heating/bending stage $ST_1$ in the furnace 2, the front part of the peripheral portion strengthening stage $ST_2$ may be provided. In the front part of the peripheral portion strengthening stage $ST_2$, a local heating means 35 is arranged to locally heating the peripheral portion of the overlapping glass plates 1 which have been subjected to the bending operation. FIG. 8 shows an embodiment of the arrangement of the local heating means 35 in the front part of the peripheral portion strengthening stage $ST_2$. It has a ring-like heater 36 which corresponds to the shape of the peripheral portion of the bend-shaping glass plates 1. The heater 36 can be moved to be close to or apart from the glass plates by means of supporting arms 37 which can descend and ascend in the same manner as the pressing means 30 shown in FIG. 1. Accordingly, the peripheral portion of the glass plates 1 can be locally heated to a reaching temperature by brining the heater 36 close to the bend-shaped glass plates which are moved by means of the transferring means 4 and are stopped at a predetermined position.

After the bending operation to the glass plates 1 has been finished, they are transferred along with the bending mold 10 to rear part of the peripheral portion strengthening stage $ST_2$ through the transferring means 4, and then, they are raised from the bending mold 10 by means of the raising means 40 so that the peripheral portion of the glass plates 1 can be effectively cooled.

The raising means is preferably arranged so as to pass into or come out through an opening 9 formed in the bottom 8 of the furnace at the peripheral portion strengthening stage $ST_2$ as shown in FIG. 1. However, the raising means 40 may be mounted on the base truck 5 transferred by the transferring means 4.

FIG. 4 shows an embodiment of the construction of the raising means 40 received in the opening 9 formed in the bottom 8 of the furnace in the peripheral portion strengthening stage $ST_2$ in more detail.

The raising means 40 comprises a ring-like supporting member 41 arranged inside and along a frame structure, which constitutes bend-shaping surfaces 12, 14, in the split type bending mold 10 as shown in FIG. 5, supporting pieces 42 extend in the supporting member 41, and supporting rods 43 connected to appropriate positions of the supporting pieces 42 to support them and movable in the vertical direction by means of an appropriate vertically movable means (not shown) such as a cylinder mechanism. It is desirable that the supporting member 41 is covered by pieces of heat resistant cloth 44 made of a material such as asbestos cloth, glass fiber cloth or another heat resistant fibers at suitable intervals so as not to cause any trace or scar on the contacting surface when the glass plates 1 are placed on the bending mold so that the portion other than the peripheral portion of the glass plates 1 is in contact with the supporting member 1. FIG. 6 is an enlarged plane view showing a part of the supporting member with several pieces of heat resistant cloth, and FIG. 7 is a cross-sectional view taken along the line 7—7 in FIG. 6. The glass plates 1 which have been subjected to the bending operation are transferred from the peripheral portion strengthening stage $ST_2$ to the gradual cooling stage $ST_3$ to be cooled. In this case, although an ordinary transferring speed is used to transfer the glass plates to the gradual cooling stage $ST_3$, it is more preferable that they are drawn from the peripheral portion strengthening stage $ST_2$ toward the gradual cooling stage $ST_3$ at a speed faster than the ordinary speed to thereby improve a gradient of temperature for cooling.

Figure 9:
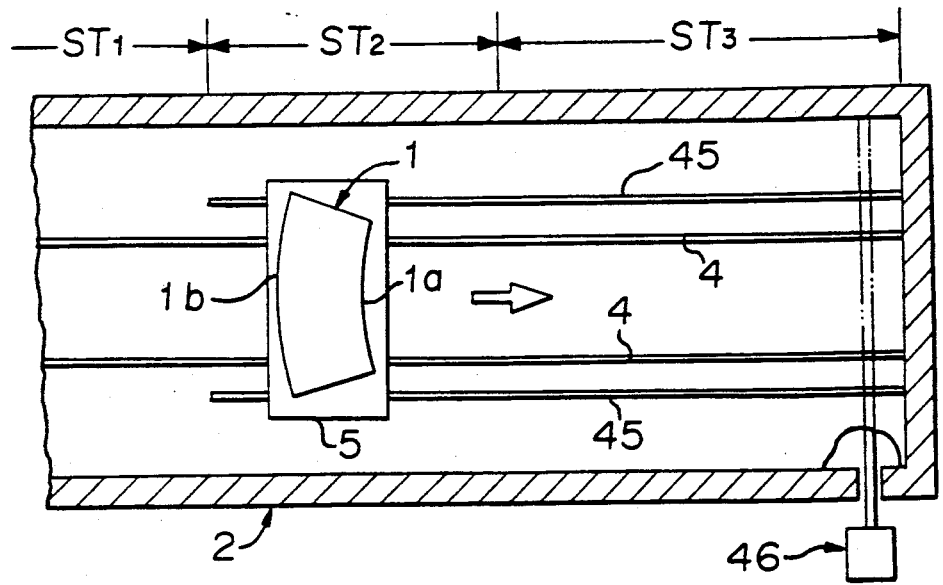
FIG. 9 is a diagram showing an embodiment of a quickly drawing means.

FIG. 9 is a diagram showing such quick drawing operation for the glass plates 1, wherein the transferring means 4 such as a chain conveyor normally used for moving the base truck at the ordinary speed, and rails 45 for quick transferring are arranged on the bottom 8 of the furnace 2 in order to move into and out of from the bottom 8. With such arrangement, the base truck 5 can be fitted to the rails 45 for quick transferring and it can be introduced in the gradual cooling stage $ST_3$ at a faster speed by means of an appropriate quickly driving means 46. Alternatively, the quick drawing operation can be carried out by transferring the base truck 5 from a chain conveyor or a roller conveyor moved at a low transferring speed to a chain convayor or a roller conveyor moved at a high transferring speed.

Heretofore, the overlapping glass plates 1 were transferred to the gradually cooling stage $ST_3$ with such positional relationship that the upper side 1a (in view of the position of the laminated glass fitted to an automobile) is ahead the lower side 1b, and the lower side 1b was transferred into the gradually cooling stage $ST_3$ with some delay to the upper side 1a, hence cooling to the lower side 1b was more or less late. However, by using the above-mentioned quick transferring method, it is possible to cool the upper side 1a (which is at the downstream side) in the transferring direction as well as the lower side 1b (at the upstream side) without delay, hence, a relatively large compression stress can be given.

The glass plates 1 are generally transferred at a speed of 0.1 m/sec–0.2 m/sec in the ordinary transferring rate. However, it is preferable to move them at a speed of 0.7 m/sec–1.5 m/sec in the quick transferred rate.

Table 1 shows stresses obtained under the quick transferring condition according to the present invention and stresses obtained by the ordinary transferring condition.

TABLE 1

|  | Moving time (sec) | The upper side of the overlapping glass plates (downstream side in the transferring direction) kg/cm² | | The lower side of the overlapping glass plates (upstream side in the transferring direction) kg/cm² | |
| --- | --- | --- | --- | --- | --- |
|  |  | E/C | I/T | E/C | I/T |
| Ordinary transferring speed | 13 | 110 | 10 | 60 | 10 |

TABLE 1-continued

|  | Moving time (sec) | The upper side of the overlapping glass plates (downstream side in the transferring direction) kg/cm² | | The lower side of the overlapping glass plates (upstream side in the transferring direction) kg/cm² | |
| --- | --- | --- | --- | --- | --- |
|  |  | E/C | I/T | E/C | I/T |
| Quick transferring speed | 5 | 160 | 20 | 145 | 20 |

In Table 1, E/C shows average compressive stress value sat the peripheral portion of the glass plates and I/T shows average tensile stress value at the inner portion of the area where the compressive stress layer is formed.

It is found in the Table 1 that by drawing the glass plates 1 into the gradual cooling stage ST3 under the quick transferring condition, a large difference in compressive stress of the upper side 1a and that of the lower side 1b does not form, the average value between the upper and lower sides can be made larger than those obtained by the ordinary transferring condition, and excellent strengthening treatment on the peripheral portion of the glass plates can be obtained because the tensile stress is the same level.

FIG. 8 shows in detail the construction of the local heating means 35. When the peripheral portion of the overlapping glass plates 1 is locally heated by the local heating means 35 after they are subjected to the bending operation, it is clear that a larger compressive stress can be imparted to the peripheral portion as the reaching temperature is high. In this case, however, deformation is caused in the glass plates and/or the tensile stress in the glass plates becomes large. Accordingly, there is a limitation in practical use with respect to the reaching temperature. Therefore, the temperature for the glass plates 1 can be adjusted in a suitable range by controlling the distance between the heater 36 and the glass plates 1 and power to be supplied to the heater 36.

Table 2 shows an example of values obtained by gradually cooling the glass plates after the local heating opertaion and values obtained by gradually cooling them without the locally heating operation.

TABLE 2

|  | Reaching temperature | E/C (kg/cm²) | I/T (kg/cm²) |
| --- | --- | --- | --- |
| Without locally heating | 575° C. | 80 | 25 |
| Locally heating | 595° C. | 135-95 | 55 |

As is clear from Table 2, a large compressive stress can be imparted to the peripheral portion of the overlapping glass plates 1 when they are subjected to local heating followed by gradual cooing in comparison with the case that they are gradually cooled without local heating.

Further preferable results can be obtained when the local heating operation is combined with the quick transferring operation.

In producing a laminated glass from the two overlapping glass plates by the bend-shaping operation, the press-shaping operation for a portion of the overlapping glass plates 1 to be deeply bent by the pressing means 30 at the rear part of the heat/bending stage ST₁ may be conducted on a fixed type bending mold, i.e. a non-split type bending mold having a ring-like shaping mold having a bent-shaping surface corresponding to the portion to be deeply bent of the glass plates 1, which is different from the above mentioned deadweight bending mold 10 with the fixed mold 11 and the movable molds 13 on which the overlapping glass plates 1 are provisional shaped. When the deep-bending operation is conducted on the fixed type bending mold by transferring the glass plates from the deadweight bending mold 10, the jumping of the movable molds 13 at the time of press-shaping can be eliminated and the deformation of the glass plates 1 can be prevented.

Another embodiment of the present invention in which the glass plates are transferred from the deadweight bending mold having the fixed mold and the movable molds to a non-split type bending mold where the deep-bending operation is carried out, will be described with reference to FIGS. 10-36.

Figure 10:
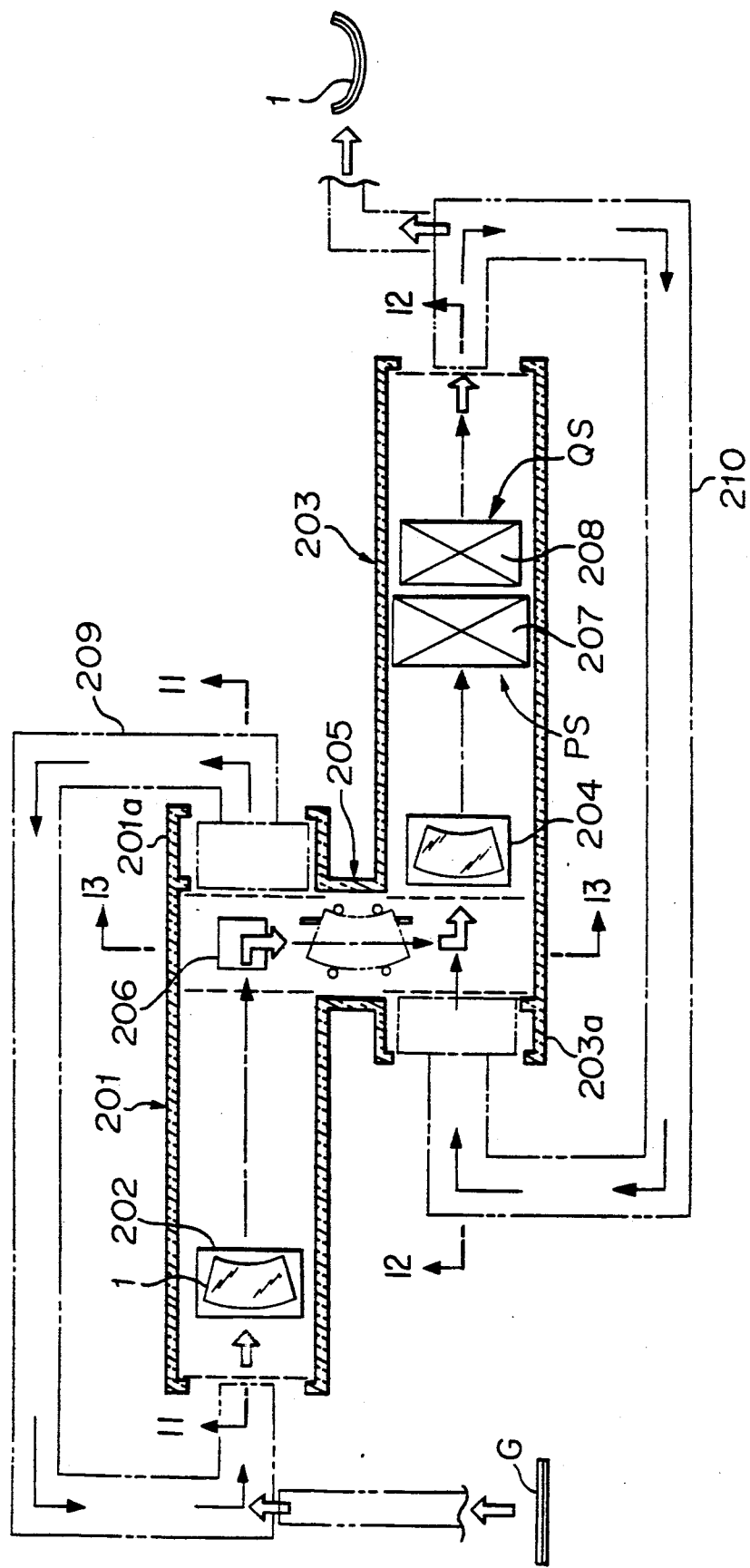
FIG. 10 is a diagram in a form of model showing another embodiment of the apparatus for bending glass plates for laminated glass according to the present invention.

FIG. 10 is a diagram showing in a form of model an embodiment of a system of deep-bending both sides of two overlapping glass plates which are transferred from a first bending mold to a second bending mold which is different from the first bending mold.

In this embodiment, the bend-shaping apparatus for the two overlapping glass plates comprises a heating furnace 201 for provisional bending the overlapping glass plates 1, a transferring furnace 205 which communicates at its one side with the heating furnace 201 for provisional bending in a substantially perpendicular direction, and a heating furnace 203 for regular bending the provisional shaped two overlapping glass plates, the heating furnace 203 communicating at its one side with the transferring furnace 205 in a substantially perpendicular direction and extending to the opposite side to the heating furnace 201 for provisional bending.

As shown in FIGS. 10 and 11, the heating furnace 201 for provisional bending (hereinbelow, referred to as the provisional bending furnace) is provided with a number of heaters 211 to keep the temperature in the provisional bending furnace 201 at a temperature which is capable of bending the glass plates 1 (about 550° C.-650° C.) for bending sodalime silicate glass for automobiles, (preferably about 550° C.-600° C.). The provisional bending furnace 201 and the connecting portion between the provisional bending furnace 201 and the transferring furnace 205 are adapted to circulate a number of provisional bending molds 202 are placed on base trucks 212 by means of chain conveyor (not shown) along a passage indicated by two dotted chain line. In FIG. 10, the reference numeral 201a designates a cooling furnace arranged at the exit side of the provisional bending furnace 201 and numeral 209 designates a circulating passage for circulating the provisional molds 202.

The heating furnace for regular bending (hereinbelow referred to as the regular bending furnace 203) has a number of heaters 231 to maintain temperature in the furnace at a temperature capable of bending the glass plates 1 as shown in FIGS. 10 and 12. The regular bending furnace 203 and the connecting portion between the regular bending furnace 203 and the transferring furnace 205 are adapted to circulate a number of regular bending molds 204 placed on base trucks 232 by means of a chain conveyor (not shown) along a circulating passage 210 which is indicated by two dotted chain line. The regular bending furnace 203 is provided with a pressing stage PS which includes a pressing means 207 for press-shaping an incompletely shaped portion of the glass plates 1. In the rear of the pressing stage PS, a peripheral portion strengthening stage QS is provided in which a peripheral portion strengthening and cooling means 208 for strengthening and cooling the peripheral edge of the bend-shaped glass plates 1 is arranged. In FIG. 10, a reference numeral 203a designates an provisional heating furnace provided at the inlet side of the regularly bending furnace 203.

Figure 13:
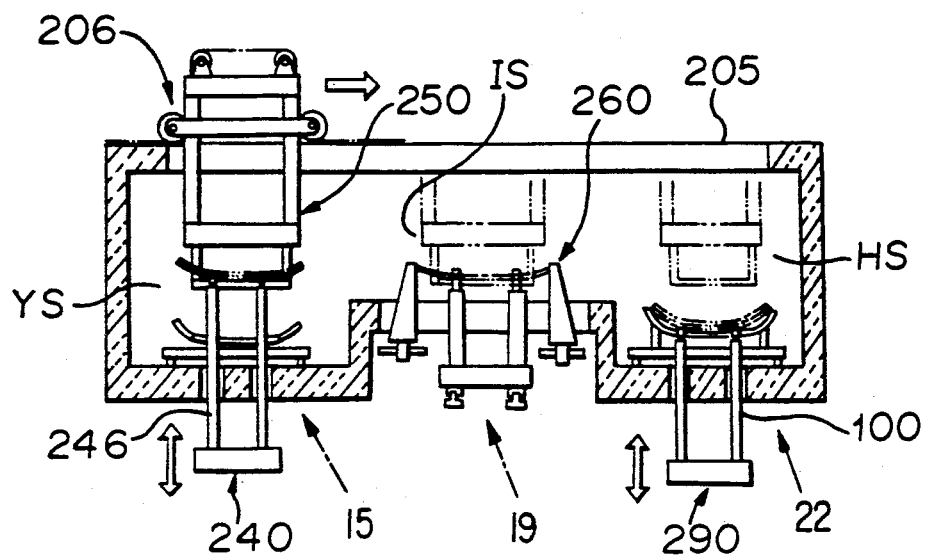

As shown in FIGS. 10 and 13, the transferring furnace 205 has a heater (not shown) to keep the temperature in the furnace at a temperature lower than the glass bending temperature. A transferring means 206 for transferring the provisional shaped glass plates 1 is arranged in the transferring furnace 205.

In this embodiment, the provisional bending mold 202 may be of the same type as the deadweight bending mold as shown in FIGS. 2 and 3.

Figure 14:
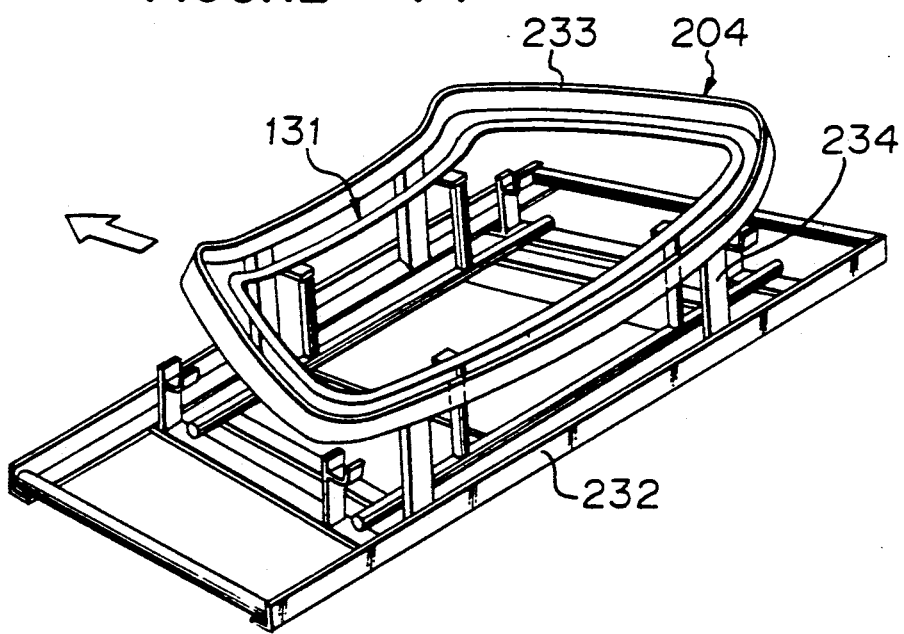
FIG. 14 is a perspective view showing an embodiment of the regularly bending mold according to the present invention.

On the other hand as shown in FIG. 14, the regular bending mold 204 as a ring like fixed mold having a bend-shaping surface 233 corresponding to a shaping surface of the glass plates 1. The fixed mold is fixed onto the base truck 232 by means of supporting bars 234. A raising mold 131 (which will be described in detail hereinbelow) for raising the glass plates 1 from the regular bending mold 204 and for holding the same in response to the actuation of the peripheral portion strengthening means 208, is arranged at the inside of the regular bending mold 204. As shown particularly in FIG. 13, the transferring means 206 comprises a first raising and holding means 246 for raising upwardly and holding the provisional shaped two glass plates from the provisional bending mold 202 which is set at a position-determining stage YS for the provisional bending mold 202 in the transferring furnace 205, a transferring hoist 250 for holding and transferring the two glass plates which are raised and held by the first raising and holding means 246, a position aligning means 260 arranged in a position-aligning stage IS in the transferring passage of the transferring hoist 250 to effect position alignment with respect to the regular bending mold 204, and a second raising and holding means 100 which holds temporarily the glass plates which have been transferred by the transferring hoist 250 and have been moved to the position-aligning point with respect to the regular bending mold 204 and which transferrs the glass plates on the regular bending mold 204 which has been position-determining in the position deteremining stage HS for the regular bending mold 204 in the transferring furnace 205.

Figure 15:
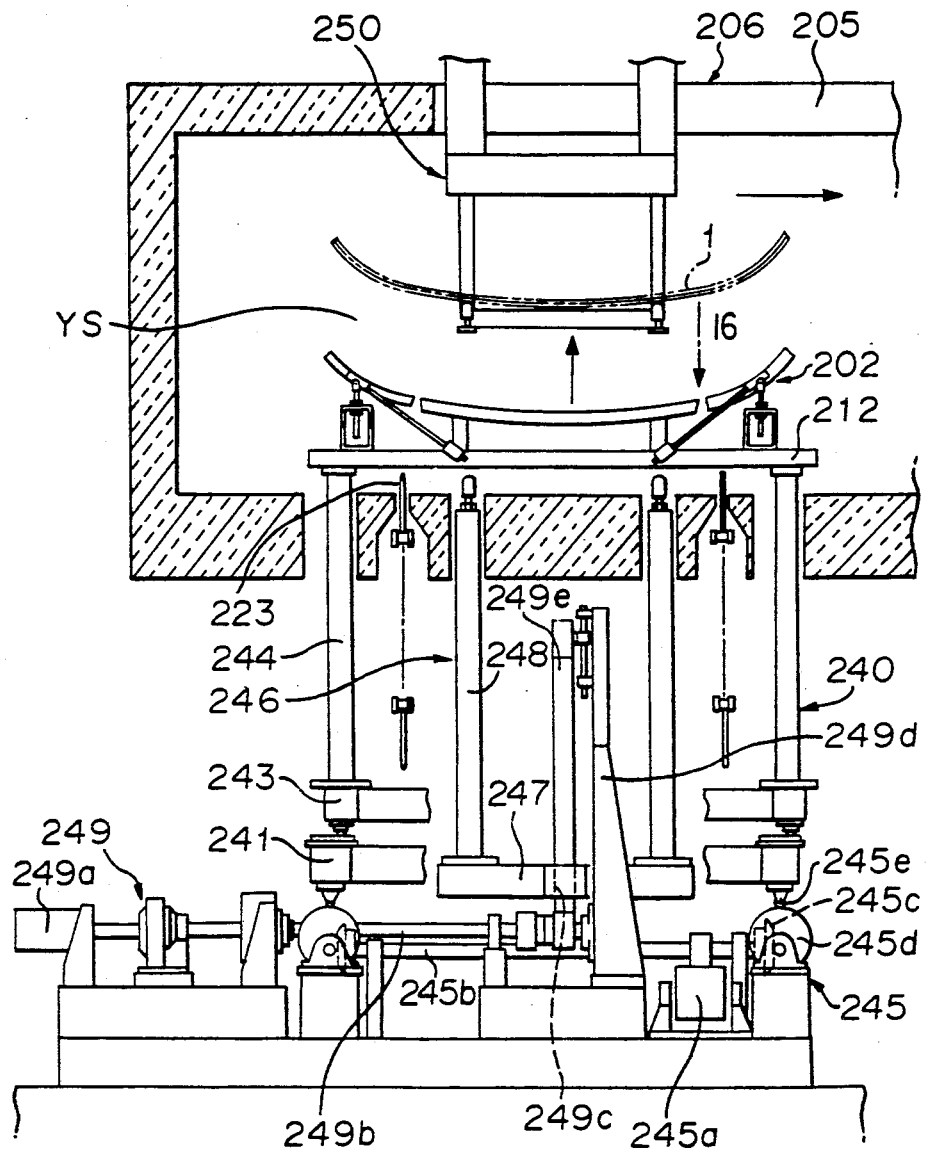
FIG. 15 is an enlarged view partly broken and cross-sectioned to the part indicated by 15 in FIG. 13.
Figure 16:
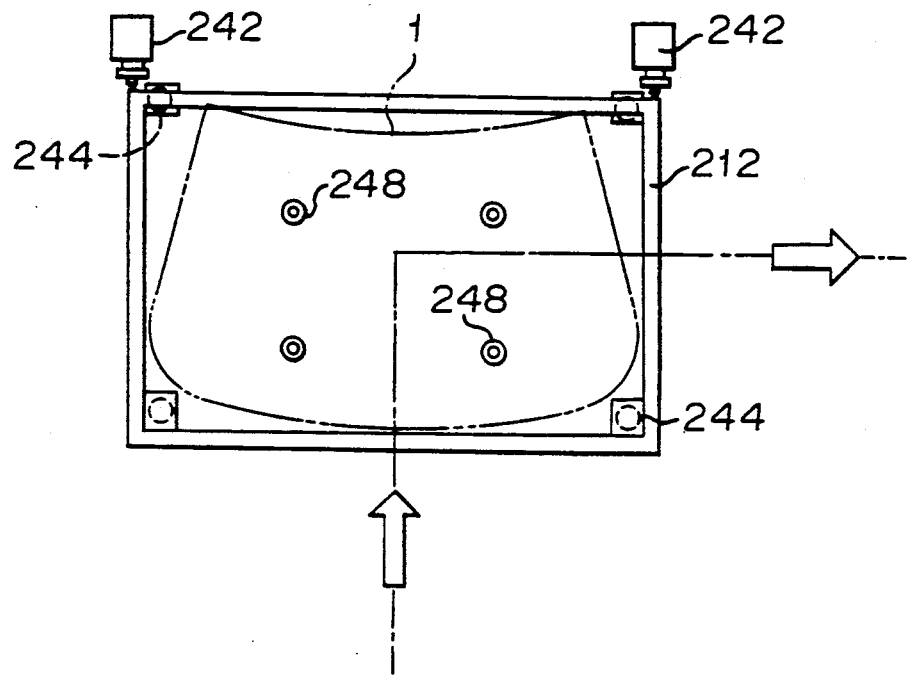
FIG. 16 is a diagram viewed from the direction of 16 in FIG. 15.

In this embodiment, a first position-determining means 240 for the provisional bending mold 202 releases the engagement between a chain conveyor 223 and the base truck 212 in the position-determining stage YS as shown in FIGS. 15 and 16. The first position-determining means 240 is constructed, for instance, by a position-determining elevating table 241 arranged at the lower portion corresponding to the base truck 212, a pair of stoppers 242 disposed at the side of the direction of moving the provisional bending mold 202 in the elevating table 241, a rectangular supporting frame 243 mounted on the position-determining elevating table 241, a plurality of supporting rods 244 (four supporting rods are used in this embodiment) provided at each corner portion of the supporting frame 243, and a position-determining driving means 245 for elevating and lowering the position-determining elevating table 241.

The position determining driving means 245 comprises a driving cylinder 245a, a transmitting shaft 245b for transmitting a driving force from the driving cylinder 245a, a bevel gear mechanism 245c for transmitting the driving force of the transmitting shaft 245b by changing the direction of the rotation of the driving force, an eccentric cam 245d rotated by the bevel gear mechanism 245c, and a supporting roller 245e which is in sliding contact with the circumferential surface of the eccentric cam 245d and functions as a supporting point for the position-determining elevating table 241, whereby the position-determining elevating table 241 vertically moves corresponding to an amount of eccentricity of the eccentric cam 245c.

As shown particularly in FIGS. 15 and 16, the first raising and holding means 246 comprises an elevating table 247 arranged below the provisional bending mold 202, four raising rods 248 uprightly attached to the elevating table 247 in the inner area of the provisional bending mold 202 and a vertical driving means 249 for elevating and lowering the elevating table 247.

The vertical driving means 249 comprises, for instance, a driving motor 249a, a transmitting shaft 249b for transmitting a driving force of the driving motor 249a, a female screw portion 249c formed at a part of the elevating table 247, and a ball screw 249e which is engaged with the female screw 249c and is supported uprightly by means of a supporting bracket 249d so that the transmitting shaft 249b and the ball screw 249e are functionally coupled to each other by means of a gear mechanism (not shown) so as to transmit the driving force of the transmitting shaft 249b to the ball screw 249e.

Figure 17:
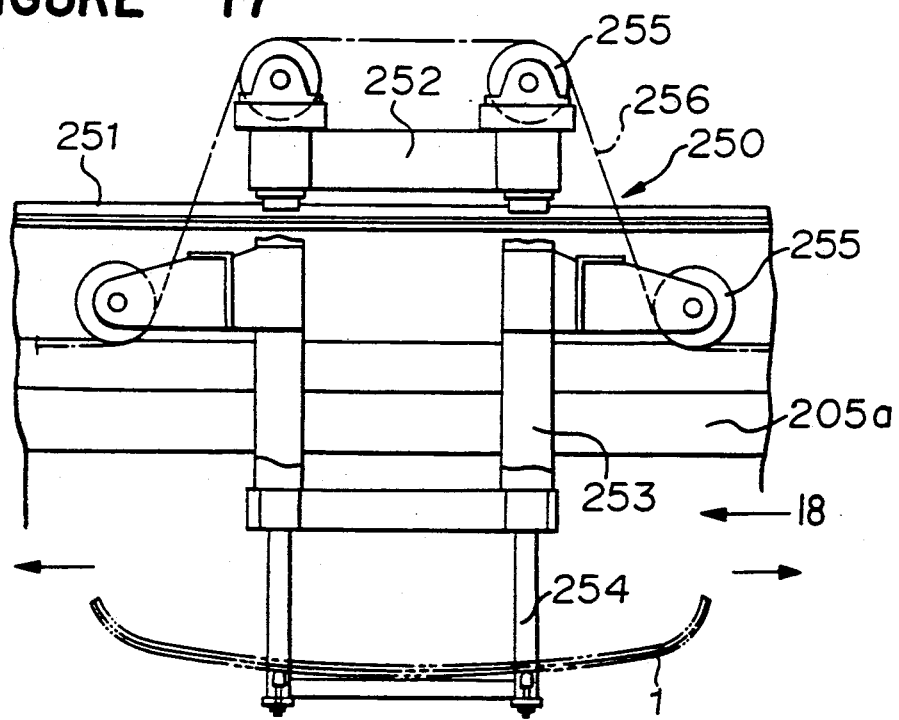
FIG. 17 is a diagram showing a transferring hoist used for the apparatus according to the present invention.
Figure 18:
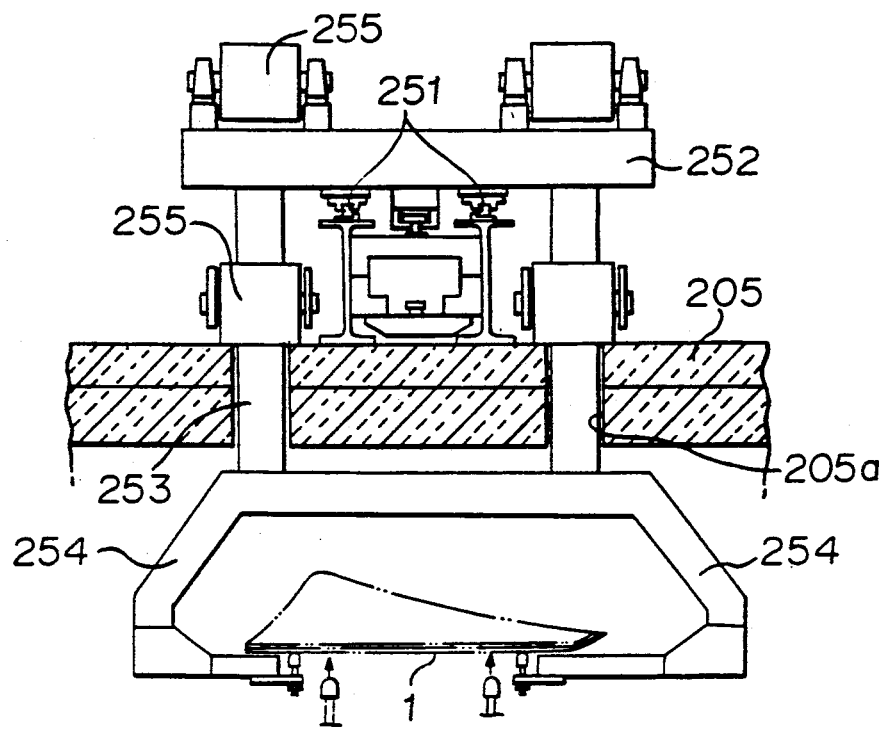
FIG. 18 is a diagram viewed from the direction of 18 in FIG. 17.
Figure 21:
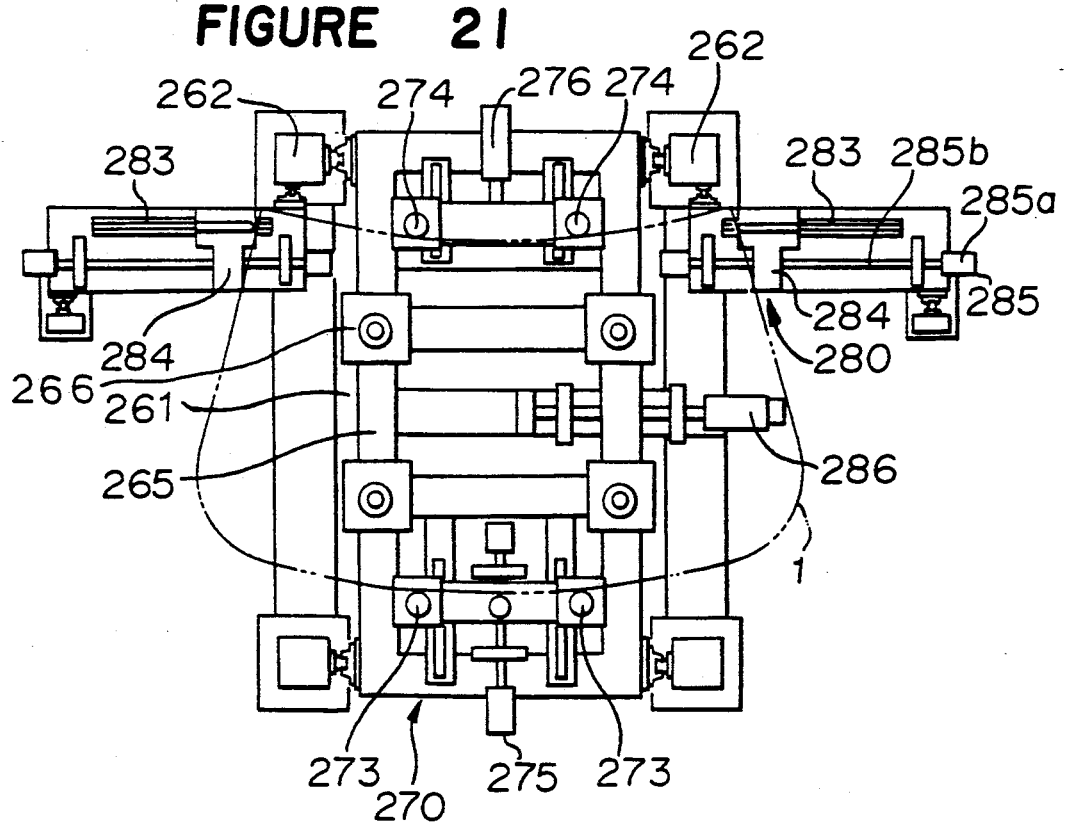
FIG. 21 is a plane view showing the position aligning means as shown in FIG. 19.

As shown in FIGS. 13, 17 and 18, the transferring hoist 250 comprises a sliding member 252 slidable along guide rails 251 extending on the upper wall of the transferring furnace 205, a plurality of suspending rods 253 extending from the sliding member 252 through slits 205a formed in the upper wall of the transferring furnace 205, four holding arms 254 attached to the suspending rods 253 to hold the two glass plates, a plurality of guide pulleys 255 attached to the sliding member 252 and a driving wire 256 which is extended between a driving pulley and a following pulley (both not shown) and between the driving pulley and the guide pulleys in the vicinity of the upper wall of the transferring furnace 205 to thereby drive the sliding member 252.

In this embodiment, the transferring hoist 250 is brought to a stand-by position which does not interfere with the glass plates 1 during the raising operation by the first raising and holding means 246 to the glass plates 1, and it is moved to a holding position when the glass plates 1 are fully brought to the raised position, and thereafter, the glass plates 1 are held by the holding arm 254 when the raising rods 248 lower.

Figure 19:
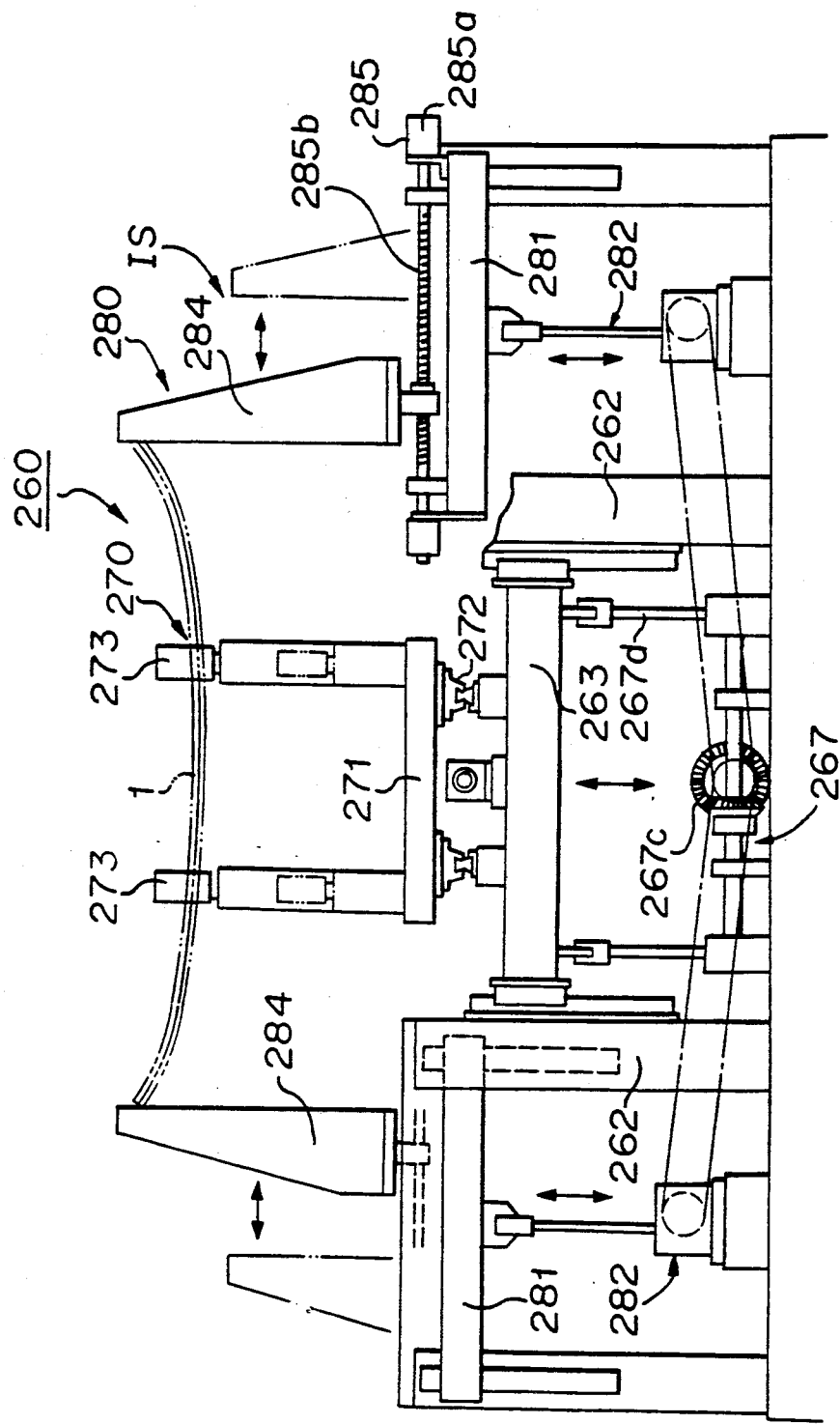
FIG. 19 is a diagram of an embodiment of a position aligning means indicated by 19 in FIG. 13.
Figure 20:
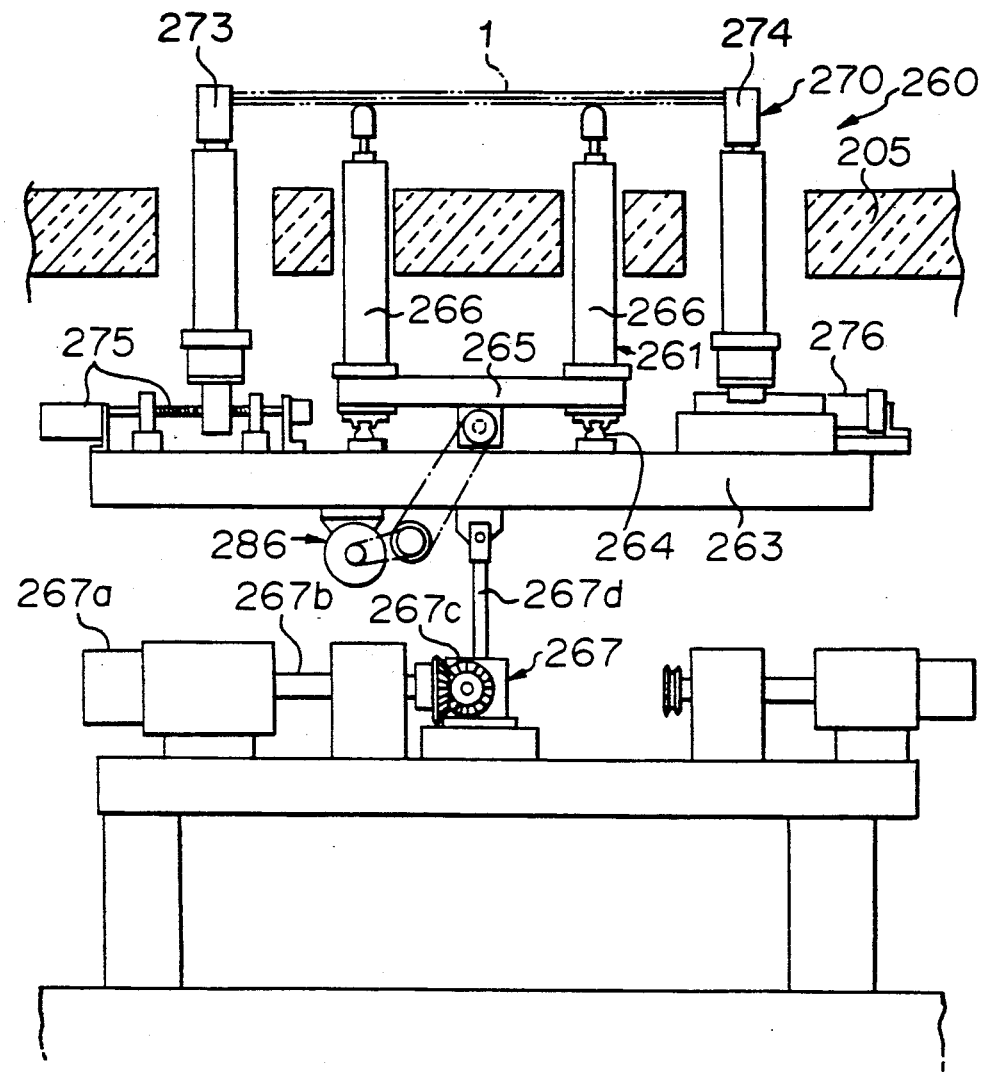
FIG. 20 is a side view of the position aligning means shown in FIG. 19.

The position-aligning means 260 comprises a raising and holding means 261 which temporarily holds the glass plates 1 from the transferring hoist 250 at the position-aligning stage IS, a plate aligning means 270 for aligning the two glass plates held by the raising and holding means 261 and a position-adjusting means 280 for adjusting a set position to the regular bending mold 204 as shown in FIGS. 19 and 20.

The raising and holding means 261 comprises a first elevating table 263 vertically movable along the guide bars 262, a movable frame 265 slidably mounted on the first elevating table 263 through sliding guides 264 along the direction of moving the transferring hoist 250, a plurality of raising rods 266 (in this embodiment, four raising rods are used) provided on the movable frame 265, and a vertical driving means 267 comprising a driving motor 267a, a transmitting shaft 267b, a bevel gear mechanism 267c, a ball screw means 267d and so on, whereby the first elevating table 263 can be moved vertically.

The plate aligning means 270 is constituted by arranging a pair of movable base membrs 271 which are faced opposite each other in the first elevating table 263 so as to be perpendicular to the moving direction of the transferring hoist 250; by attaching the movable base members 271 in a slidable manner through slidable guides 272 extending in the direction perpendicular to the moving direction of the transferring hoist; by setting up each pairs of plate aligning bars 273, 274 to each of the movable base members 271; by disposing a driving actuator 275 with a ball screw means so as to move one pair of plate aligning bars 273 to a correct plate-aligning position; and by disposing an air cylinder 276 so as to move the other pair of plate aligning bars 274 to move them to a plate-aligning position.

Figure 22:
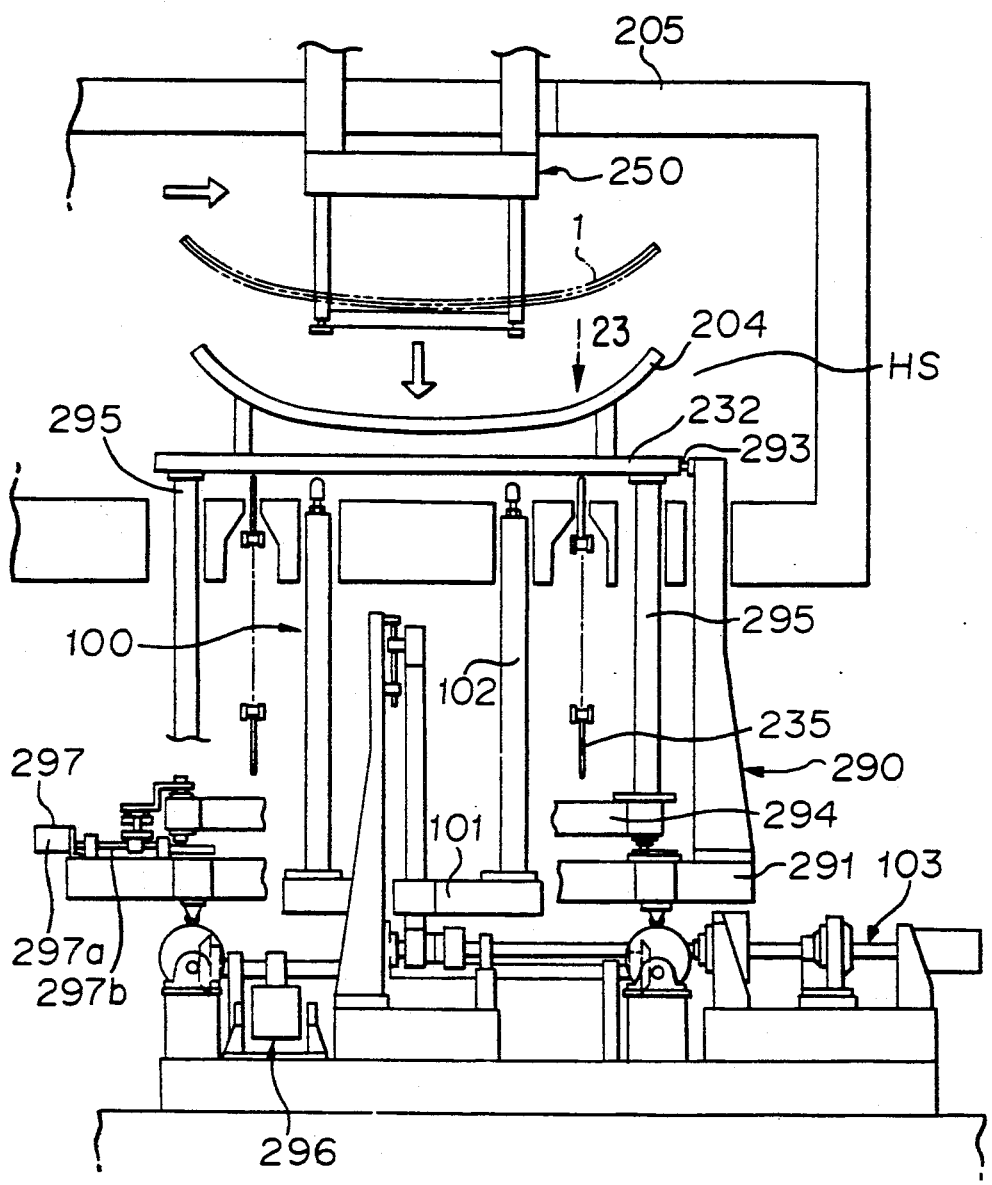
FIG. 22 is a diagram showing a portion indicated by 22 in FIG. 13.
Figure 23:
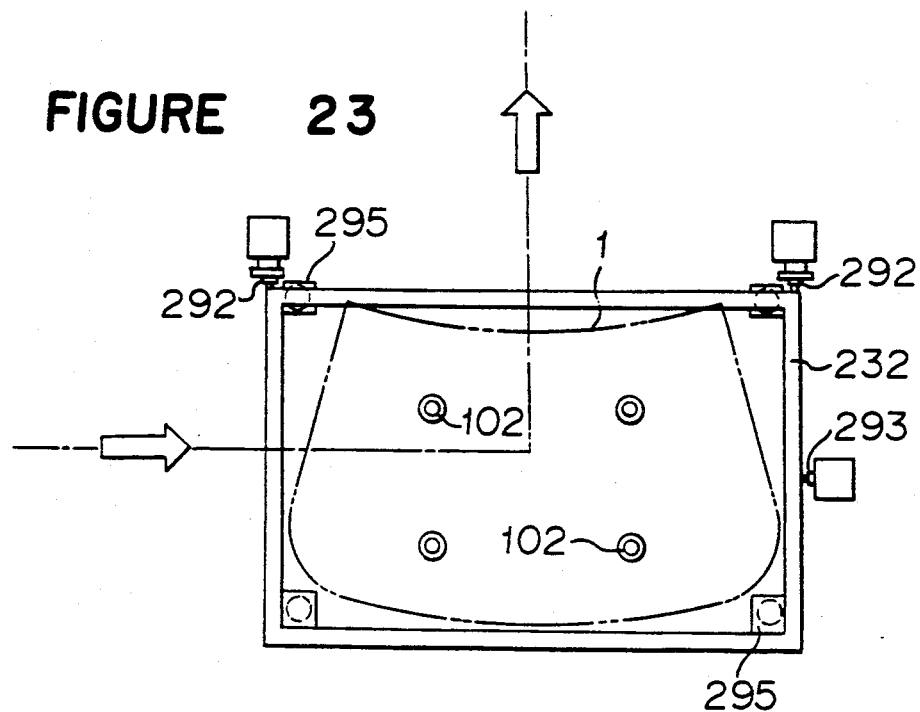
FIG. 23 is a diagram viewed from the direction of 23 in FIG. 22.

The position adjusting means 280 is constituted by arranging a pair of second elevating tables 281 at the outerside of the first elevating table 263 extending in the moving direction of the transferring hoist 250 so as to be movable along the guide bars 262; by providing a pair of driving systems 282 for transmitting the driving force of vertically driving means 267 of the raising and holding means 261 so that the second elevating tables 281 move vertically along with the first elevating table 263; by slidably attaching scale-plate-aligning bars 284 in the second elevating tables 281 through sliding guides 283 extending along the moving direction of the transferring hoist 250; and by arranging a control actuator 285 comprising a driving motor 285a such as a t servo motor and a ball screw 285b to thereby move the scale-plate-aligning bars 284, whereby the position of stopping the scale-plate-aligning bars 284 is discriminated by a control means (not shown) on the basis of information on the change of an electric current flowing in the driving motor 285a at the time of the contact of the scale-plate-aligning bars 284 to the end portion of the glass plates 1; a deflection quantity with respect to the regular position (the set position on the regularly bending mold 204) of the glass plates 1 is calculated by the control means; and the movable frame 265 of the raising and holding means 261 is changed by a position adjusting means 286 to thereby correct the deflection quantity In this embodiment, a position-determining means 290 for the regular bending mold 204 releases the engagement of the chain conveyor 235 with the base truck 232 at the position-determining stage HS as shown in FIGS. 22 and 23. The position-determining means 290 comprises, for instance, a position-determining elevating table 291 arranged at a lower part which corresponds to the base truck 231, a pair of stoppers 292 attached to the base truck 232 at positions in the moving direction of the regular bending mold 204 on the position-determining elevating table 291, a side-position-determining stopper 293 attached to a side of the regular bending mold 204, a rectangular supporting frame 294 placed on the position-determining elevating table 291 so as to be slidable along the direction of width of the regularly bending mold 204, a plurality of supporting rods 295 (in this embodiment, four supporting rods are used) attached to each corner portion of the supporting frame 294, a position-determining driving means 296 which vertically moves tne position-determining elevating table 291, and side-position-determining driving means 297 which move the supporting frame 294 toward the side-position-determining stopper 293 until the base truck 232 comes in contact with the side-position-determining stopper 293 when the position-determining elevating table 291 is raised. For the position-dertermining driving means 296, the same mechanism as the first position-determining means 240 can be used, and for the side-position-determining means 297, the mechanism comprising the driving motor 297a and the ball screw 297b can be used.

The second raising and holding means 100 may have the same structural elements as those of the first raising and holding means 246. As shown in FIGS. 22 and 23, it comprises a first elevating table 101 disposed at a lower part of the regular bending mold 204, four raising rods 102 mounted on the elevating table 101 in the inner area of the regular bending mold 204 and a vertical driving means 103 for vertically moving the elevating table 101.

Figure 25:
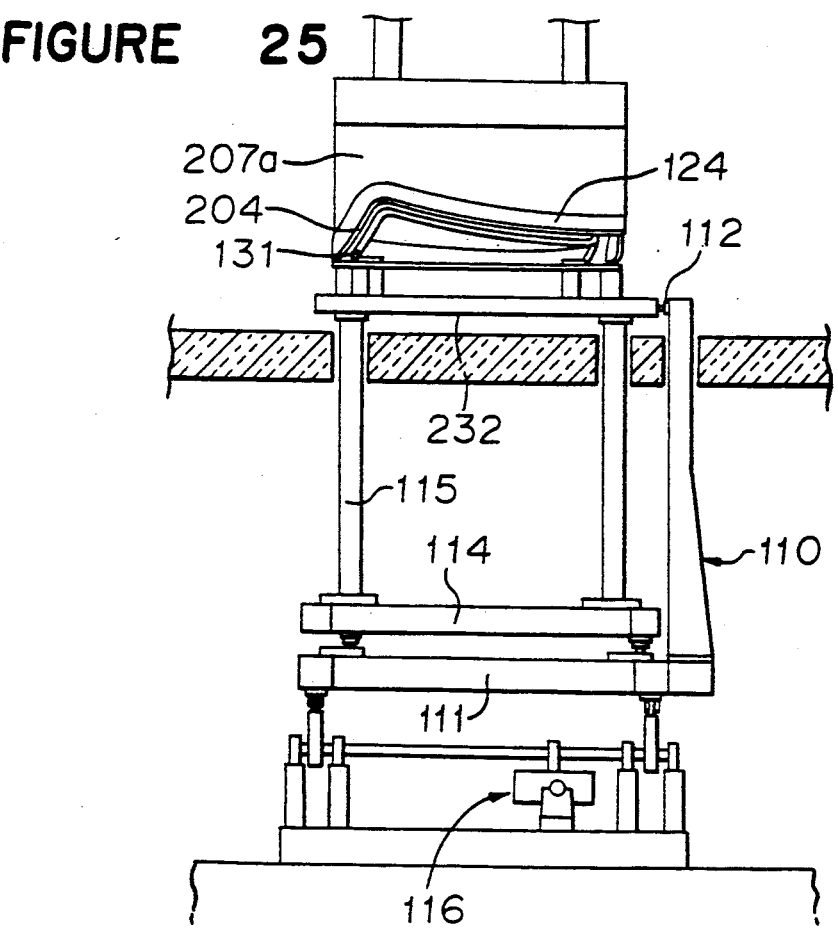
FIG. 25 is a diagram viewed from the direction of 25 in FIG. 24.
Figure 24:
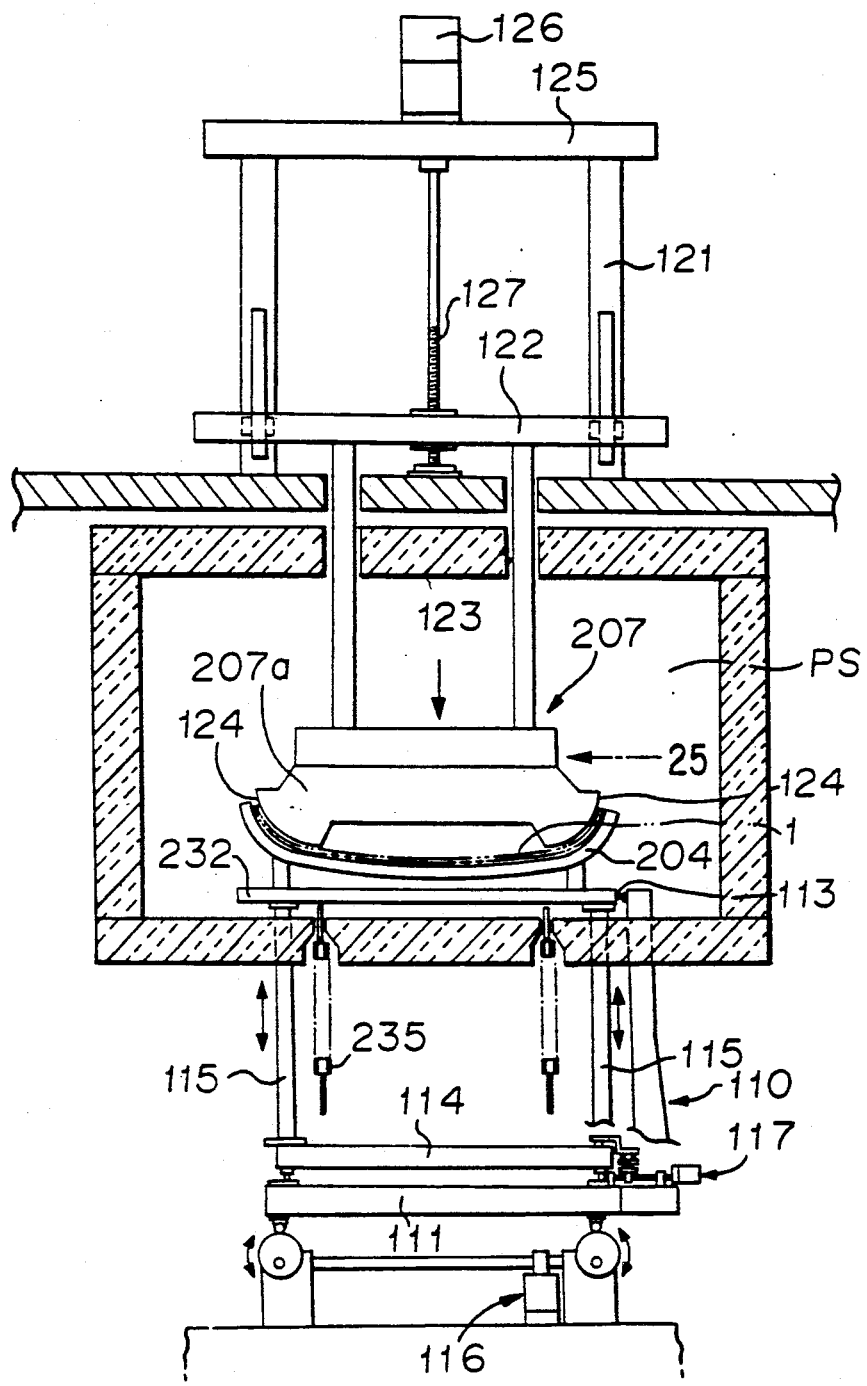
FIG. 24 is a diagram showing a portion indicated by 24 in FIG. 12.

In this embodiment, a position-determining means 110 for the regular bending mold 4 at the pressing stage PS releases the engagement of the chain conveyor 235 with the base truck 232 at the pressing stage, and it has the same construction as the position-determining means 290 in the transferring furnace 205. Specifically, as shown in FIGS. 24 and 25, the position-determining means 110 comprises a position-determining elevating table 111 arranged at the lower portion corresponding to the base truck 232, a pair of stoppers 112 attached to the position-determining elevating table 111 at the side of the moving direction of the regularly bending mold 204, a side-position-determining stopper 113 attached to the position-determining elevating table 111 at a side of the regular bending mold 204, a rectangular supporting frame 114 placed in the elevating table 111 which is slidable along the direction of the width of the regular bending mold 204, a plurality of supporting rods (e.g. four supporting rods) attached to each corner portion of the supporting frame 114, a position determining driving means 116 for elevating and lowering the elevating table 114, and a side-position-determining means 117 for moving the supporting frame 114 toward the side-position-determining stopper 113 until the base truck 232 comes in contact with the side-position-determining stopper 113 when the position-determining elevating table 111 is elevated.

The pressing means 207 placed at the pressing stage PS is constructed in such a manner that guide poles 121 are set up on the upper wall of the regular bending furnace 203; an elevating plate 122 is provided to be vertically movable along the guide poles 121; suspending rods 123 are attached to the elevating plate 122 through the openings formed in the upper wall of the furnace 203; a pressing member 207a having a press-shaping surface 124 corresponding to a portion to be deeply bent of the glass plates 1 is firmly attached to the suspending rods 123, a fitting frame 125 is attached to the upper end of the guide poles 121, a driving motor 126 such as a servo motor is mounted on the fitting plate 125; and the driving motor 126 is functionally connected to the elevating plate 122 through a ball screw 127. The pressing means 207 is adapted to gradually lower the elevating plate 122 to a position where the position of the bending mold is determined and the press-shaping surface 124 of the pressing member 207a compresses the portion to be deeply bent of the glass plates by the actuation of the pressing means.

As shown in FIG. 12, the peripheral portion strengthening stage QS is divided into a first stage QS1 to provide a temperature which is lower than a glass bending temperature and a second stage QS2 to provide a temperature which is lower than that in the first stage QS1. The peripheral portion strengthening means 208 placed at the peripheral portion strengthening stage QS comprises a raising and holding means 130 for cooling which is placed at the first stage QS1 and which raises the press shaped two overlapping glass plates 1 from the regular bending mold 204 heated at a high temperature and holds the glass plates for cooling them, a heating means 145 for heating again the peripheral portion of the two overlapping glass plates 1 raised and held by the raising and holding means 130 and a quick drawing means 150 for quickly drawing the glass plates, which have been heated again by means of the heating means 145, from the first stage QS 1 to the second stage QS2.

Figure 26:
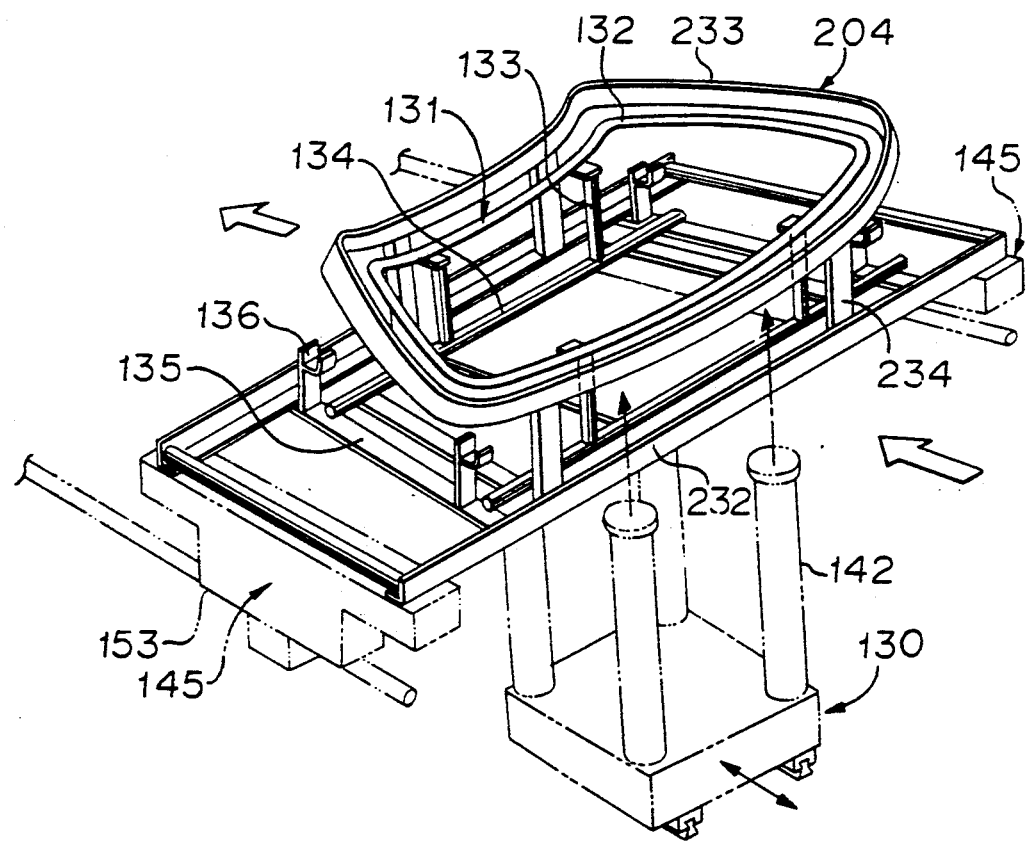
FIG. 26 is a perspective view showing the detail of a portion indicated by 26 in FIG. 12.
Figure 27:
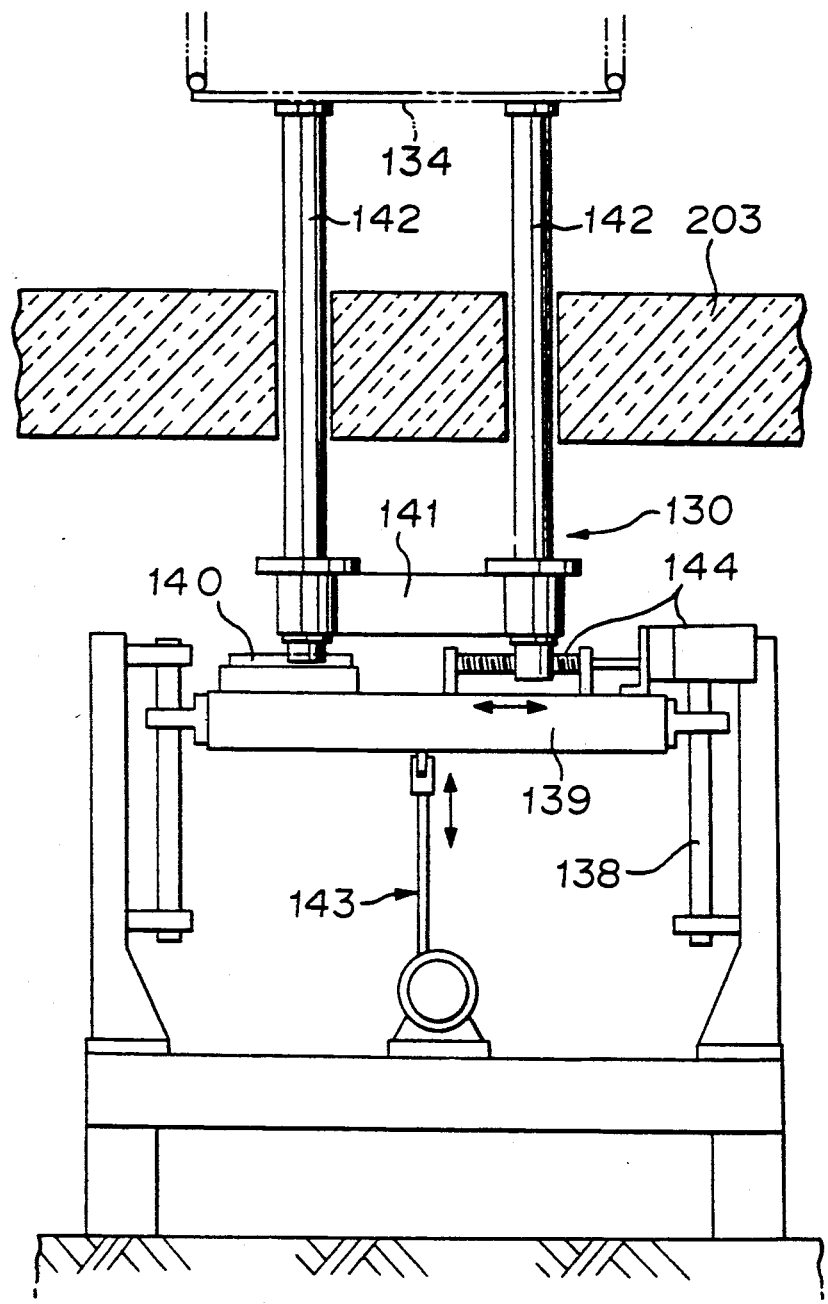
FIG. 27 is a diagram showing the detail of a raising and holding means for cooling the glass plates which is used in the embodiment of the bending apparatus according to the present invention.
Figure 28:
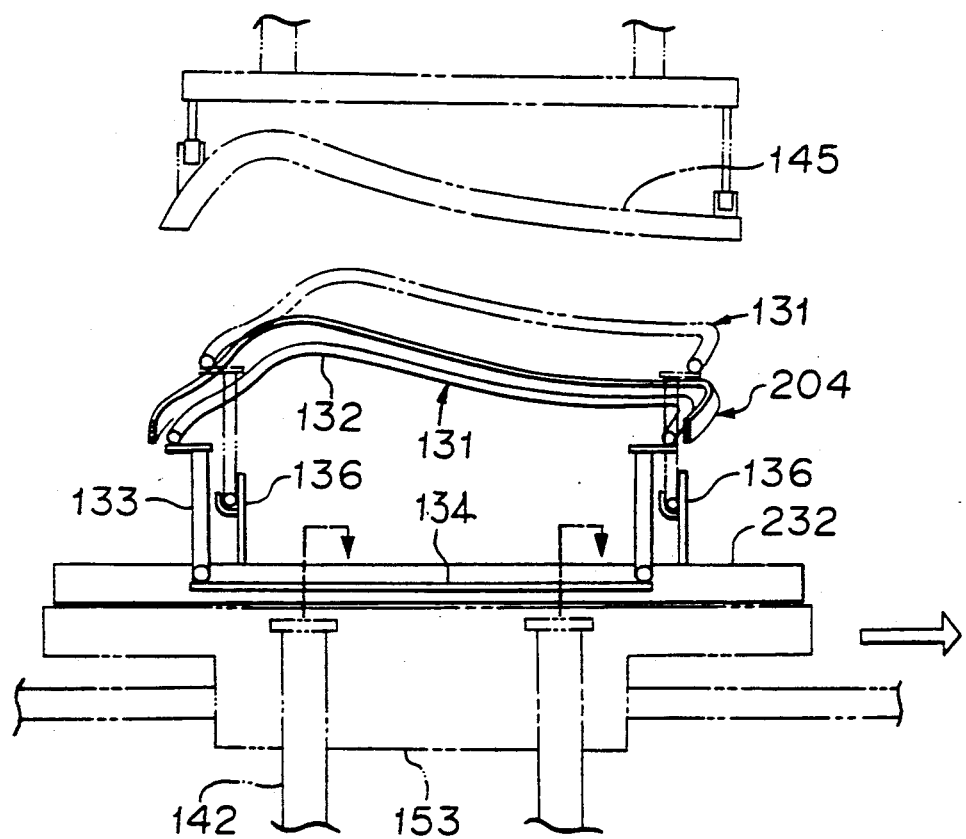
FIG. 28 is a diagram in a form of model which shows a relation of the raising and holding means for cooling glass plates to a raising mold.

The raising and holding means 130 for cooling the glass plates functions to hold the overlapping glass plates 1 in a spaced apart relationship from the regular bending mold 204 by raising upwardly a raising mold 131 disposed inside the regular bending mold 204 and by holding it at a predetermined position, as shown in FIGS. 26 to 28.

In this embodiment, the raising mold 131 comprises a ring-like frame 132 having a supporting surface which extends along the inner side from the circumferential edge portion of the glass plates 1, four supporting legs 133 suspending downwardly from suitable positions of the ring-like frame 132 and a pair of fitting bars 134 connected between the pair of supporting legs 133. The pair of fitting bars 134 are placed at suitable positions on supporting plates 135 which are laterally extended on the base truck 232. Fitting supports 136 each having a fitting part are provided on the supporting plates 135 so that the pair of fitting bars 134 can be engaged with and disengaged from the fitting supports 136. The ring-like frame 132 of the raising mold 131 is extended above the regular bending mold 204 under the condition that the fitting bars 134 are engaged with the fitting supports 136.

The raising and holding means 130 for cooling the glass plates is so constructed that guide poles 138 are set up at the lower portion of the lower wall of the regular bending furnace 203; an elevating table 139 is arranged so as to be vertically movable along the guide poles 138; a movable frame 141 is disposed on the elevating table 139 in a slidable manner through a sliding guide 140 which extends in the moving direction of the regular bending mold 204; four raising rods 142 are set up at four corners of the movable frame 141; a vertical driving means 143 comprising a driving motor, a ball screw and so on is disposed so as to vertically move the elevating table 139; and a horizontal driving means 144 comprising a driving motor, a ball screw and so on is disposed to laterally move the movable frame 141 along the sliding guide 140.

In this embodiment, the raising rods 142 are so adapted, as shown particularly in FIG. 28, to come into contact with the fitting bars 134 on the supporting plate 135 of the raising mold 131 when the elevating table 139 goes up to thereby raise the raising mold 131; to move laterally the fitting bars 134 to a position corresponding to the fitting supports 136 when the movable frame 141 moves in the lateral direction and thereafter, the raising rods 142 descend themselves. Under such circumstances, the fitting bars 134 are engaged with the fitting supports 136 and the raising mold 131 is brought to a position extended upwardly from the regular bending mold 204.

Each of the heating means 145 is a tube-like heater arranged at the upper portion of the first stage QS1 which is adapted to heat only the peripheral portion of the overlapping two glass plates 1 raised and held by the raising and hodling means 130 as shown in FIG. 28.

Figure 29:
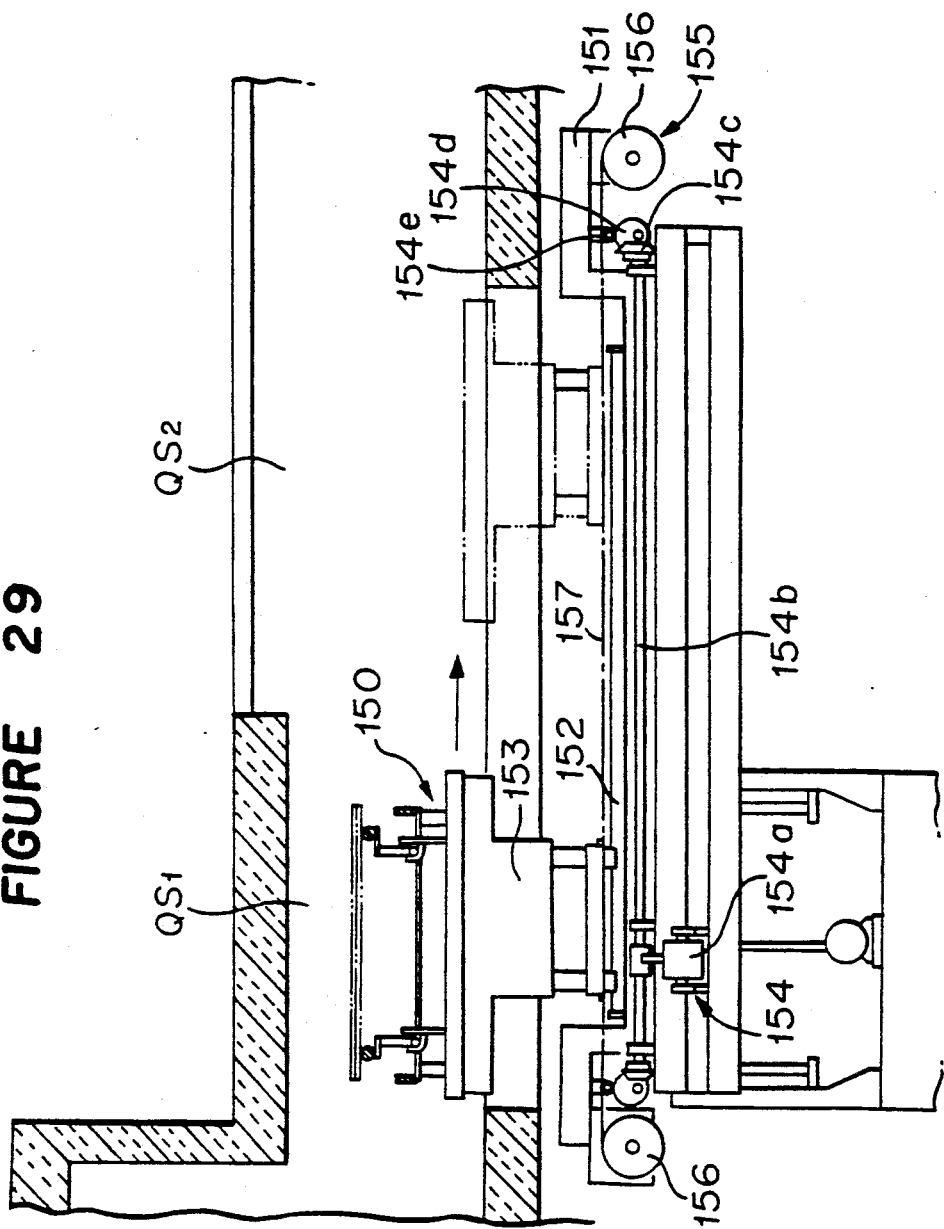
FIG. 29 is a diagram showing the detail of the quickly drawing means used in an embodiment of the present invention.
Figure 30:
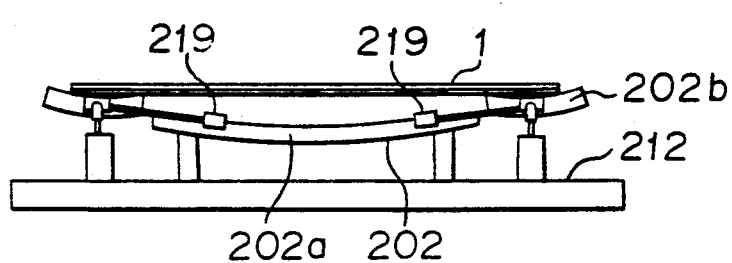
FIGS. 30 and 31 are respectively diagrams in a form of model which show steps in a provisionally bending process.
Figure 31:
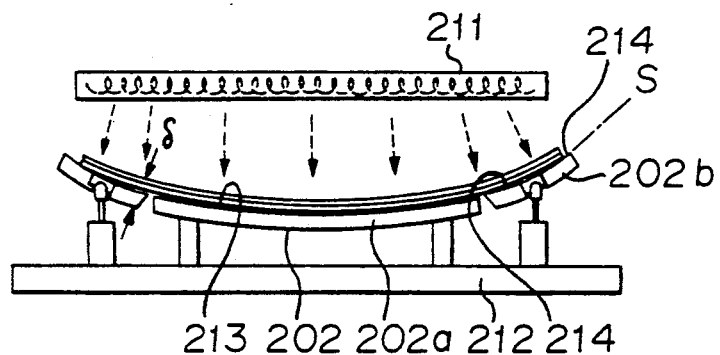

As shown in FIG. 29, the quick drawing means 150 is constituted by a pair of supporting frames 151 placed at both sides of the raising and holding means 130, guide rails 152 extended on each of the supporting frames 151, and a drawing table 153 on which the base truck 232 for the regular bending mold 204 is placed, mounted on each of the guide rails 152 in a slidable manner. The drawing table 153 is slightly raised by a vertical driving means 154 at the first stage QS1 and it is quickly drawn from the first stage QS1 to the second stage QS2 by means of a quick-drawing driving system 155. In this embodiment, the vertical driving means 154 is constituted by a driving cylinder 154a, a transmitting shaft 154b, a bevel gear mechanism 154c, an eccentric cam 154d and a supporting roller 154e attached to the supporting frame 151 which is in sliding-contact with the cicumferential portion of the eccentric cam 154d. The quick-drawing driving system 155 is constituted of a pair of guide pulleys 156 arranged in the longitudinal direction of the supporting frame 151 and a driving chain 157 extended between the pair of guide pulleys 156 which is driven by a driving motor such as a servo motor (not shown) wherein an intermediate portion of the driving chain 157 is connected to the drawing table 153.

The operation of the glass plate bending apparatus for a laminated glass according to the present invention will be described.

As shown in FIGS. 11 to 30, two glass plates, which are to be bend-shaped into a laminated glass, placed on the provisional bending mold 202 in an overlapping state while they are aligned with each other by means of an appropriate setting means. In this case, since the rigidity of the glass plates 1 is fairly high, the movable molds of the provisional bending mold 202 are held in a developed state. In such circumstances, when the glass plates 1 are transferred in the provisional bending mold 201, the glass plates are heated to a temperature which is capable of bending glass and are gradually softened. Then, the rigidity of the glass plates 1 decreases as the glass plates are softened, and the portion except for both sides of the glass plates 1 gradually deforms so as to meet the shape of the bend-shaping surface of the fixed mold. On the other hand, the moment of each of the balance weights 219 overcomes the rigidity of the glass plates and the movable molds 202b gradually raise with the result of reaching the set position. Accordingly, both sides of the glass plates 1 are deeply bent by their own deadweight so as to meet the bend-shaping surface of the movable molds.

Figure 32:
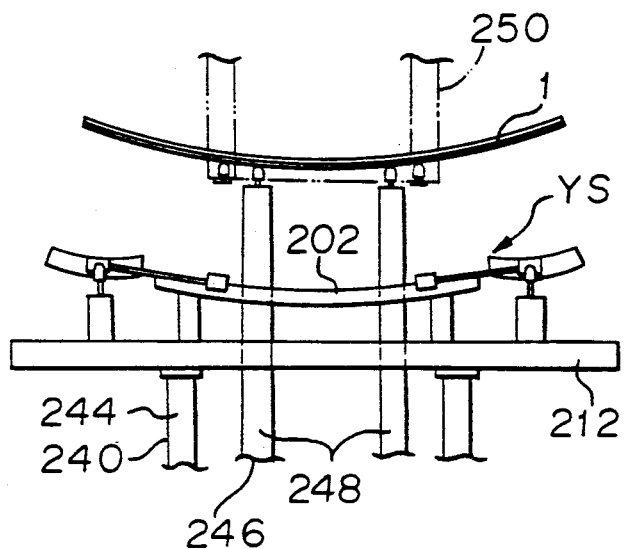
FIG. 32 is a diagram showing a step of separating the glass plates from a provisionally bending mold in a transferring process.

However, when the degree of curvature in the portion of the glass plates 1 to be deeply bent for a laminated glass is large, the portion, except for the circumferential edge of the both side portions of the glass plates, can not follow the shape of the bending mold although the circumferential edge of the both side portions of the glass plates 1 can deform to meet the bend-shaping surface of the movable molds, with the result that a gap δ is produced at the deep-bend-shaping surface of the bending mold. Thus, the deep-bend-shaping of the both side portions of the glass plates 1 becomes incomplete. Accordingly, only a provisional bending process is carried out in the provisional bending furnace 201. Then, the provisionally shaped two glass plates 1 are transferred in the position-determining stage YS for the provisional bending mold 202 in the transferring furnace 205 as shown in FIG. 13. As shown in FIGS. 15, 16 and 32, the position-determining elevating table 241 of the position-determining means 240 begins to move upwardly. When the base truck 212 carrying the provisional bending mold 202 hits the paired stoppers 242, the supporting rods 244 raise the base truck 212 which thereby separate the engagement of the base truck 212 from the chain conveyor 223. Then, the provisional bending mold 202 is position-determined at the position-determining stage YS. In the next place, the raising rods 248 of the first raising and holding means 246 elevate the glass plates 1 to a predetermined position and hold them, and the transferring hoist 250 holds the glass plates by the holding arms 254 and then, it moves in the transferring furnace 205.

As shown in FIGS. 13 and 33a, when the transferring hoist 250 reaches the position-aligning stage IS, it is temporarily stopped; the holding means 261 of the position-aligning means 260 temporarily elevates the glass plates 1 held by the transferring hoist 250 and holds the glass plates 1. Under such conditions, the plate-aligning bars 273, 274 of the plate-aligning means 270 are moved from the positions indicated by imaginary lines to the plate-aligning position indicated by the solid lines as shown in FIG. 33b. Assuming that the glass plates 1 held by the raising and holding means 261 are incorrectly placed, i.e. in an oblique state as shown by an imaginary line. Although the position-aligning operation to the regular bending mold 204 can correct a deflection in position in the direction of X with respect to the set position, some amount of deflection in position ε in the Y direction still remains. To eliminate the deflection ε, the scale-plate-aligning bar 284 of the position adjusting means 280 is moved on the basis of information of control corresponding to information of position of the scale-plate-aligning bar 284 which is in contact with the glass plates 1, whereby the position adjusting means 286 moves the raising rods 266 to thereby correct the deflection of position ε. Thus, the glass plates can be correctly placed at the set position where the position aligning is performed to the regular bending mold 204.

Figure 34:
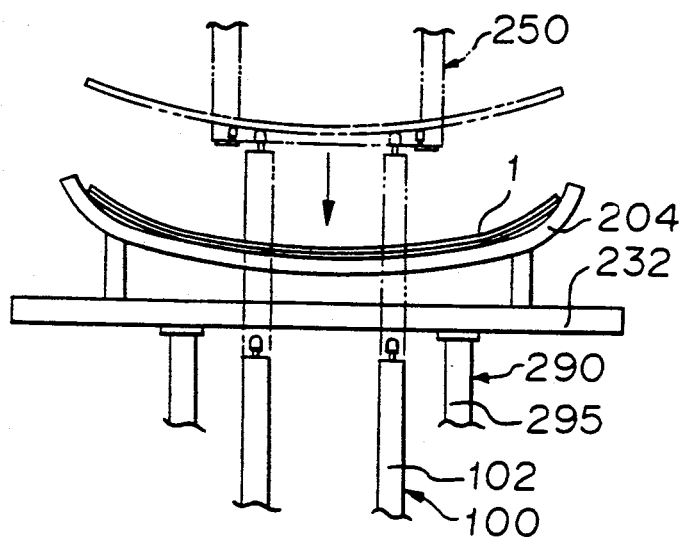
FIG. 34 is a diagram showing a step of placing the glass plates onto a regularly bending mold in the transferring process.
Figure 35:
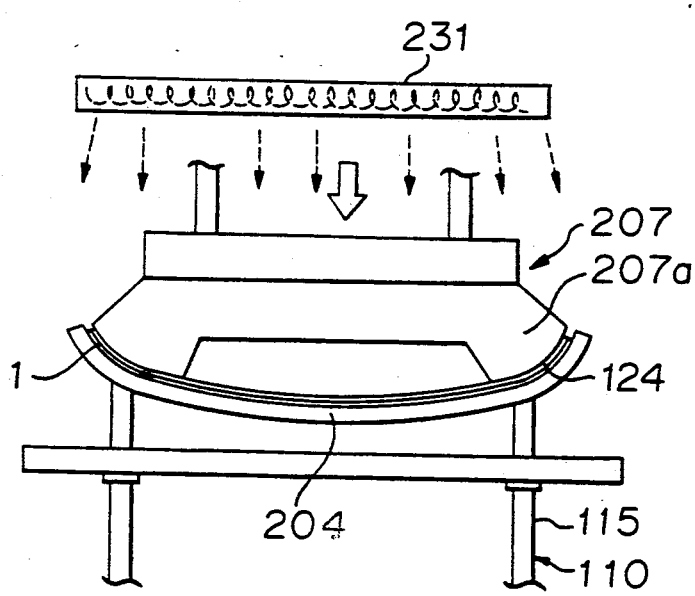
FIG. 35 is a diagram showing a pressing step in regularly bending process.
Figure 36:
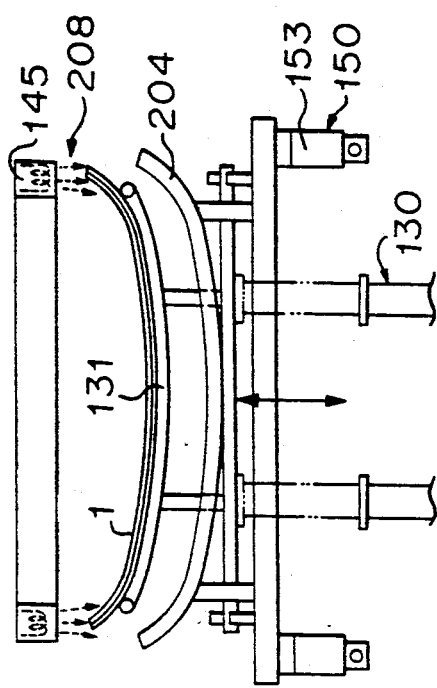
FIG. 36 is a diagram showing a peripheral portion strengthening step in the regularly bending process.

Then, the glass plates are transferred by the transferring hoist 250 to the position-determining stage HS for the regularly bending mold 204. As shown in FIGS. 13 and 34, the position of regular bending mold 204 is determined by means of the positon-determining means 290. On the other hand, the glass plates 1 are temporarily raised and held by the raising rods 102 of the second raising and holding means 100 and then, they are moved downwardly as soon as the transferring hoist 250 commences to return to the original position, whereby the glass plates are placed on the regular bending mold 204. Thus, the transfer of the glass plates 1 from the provisional bending mold 202 to the regular bending mold 204 is finished.

Then, the glass plates 1 are transferred to the pressing stage PS as shown in FIG. 12. As shown particularly in FIG. 35, the position-determining means 110 brings the regular bending mold 204 to the correct position at the pressing stage PS, and then, the pressing member 207a of the pressing means 207 descends a predetermined distance so that the pressing surface 124 of the pressing member 207a pushes the portion of the glass plates 1 to be deeply bent onto the regular bending mold 204. Thus, the portion of the glass plate 1 to be deeply bent which has been incompletely bent, is shaped in a regular shape so as to meet the press-shaping surface 124 of the pressing member 207a. In this case, since the pressing member 207a does not contact a generally curved portion (a shallow-bent-portion) of the glass plates 1, an undesired trace of press on the generally curved portion of the glass plates 1 can be avoided.

The regular bending mold 204 is transferred to the peripheral-portion-strengthening stage QS as shown in FIG. 12. At the peripheral-portion-strengthening stage QS, the base truck 232 of the regular bending mold 204 is brought to a predetermined position on the drawing table 153 of the quickly drawing means 150 by hitting a stopper (not shown). In this state, the raising and holding means 130 for cooling the glass plates 1 raises the raising mold 131 to thereby raise and hold the glass plates 1 so as to separate the peripheral edge of the glass plates 1 from the regular bending mold 204. Then, the local heating operation is conducted on the peripheral portion of the raised glass plates 1 by the heating means 145. Then, the glass plates 1 are quickly drawn from the first stage QS1 to the second stage QS2 to quickly cooled in accordance with the quick drawing operation of the drawing table 153 of the quick drawing means 150.

In the above-mentioned operation, the degree of cooling of the peripheral portion of the glass plates 1 is greater than the other portion by heating again the peripheral portion of the glass plates 1 followed by quick cooling, whereby the peripheral portion of the glass plates 1 can certainly be strengthened. Further, in this embodiment, the cooling operation of the glass plates 1 can be efficiently carried out because the glass plates are not in contact with the regular bending mold 204, hence, there is no introduction of heat from the regular bending mold 204 when the peripheral portion of the glass plates is cooled. Thus, the regular bending process for the glass plates is finished. Then, the glass plates are removed from a removing stage by means of an appropriate removing means such as a hoist, and on the other hand, the regular bending mold 204, from which the glass plates have been removed, is moved forward along the circulating passage 210 (FIG. 10) to return to the regular bending furnace 203, during which the raising mold 131 is returned to its original position.

Figure 37:
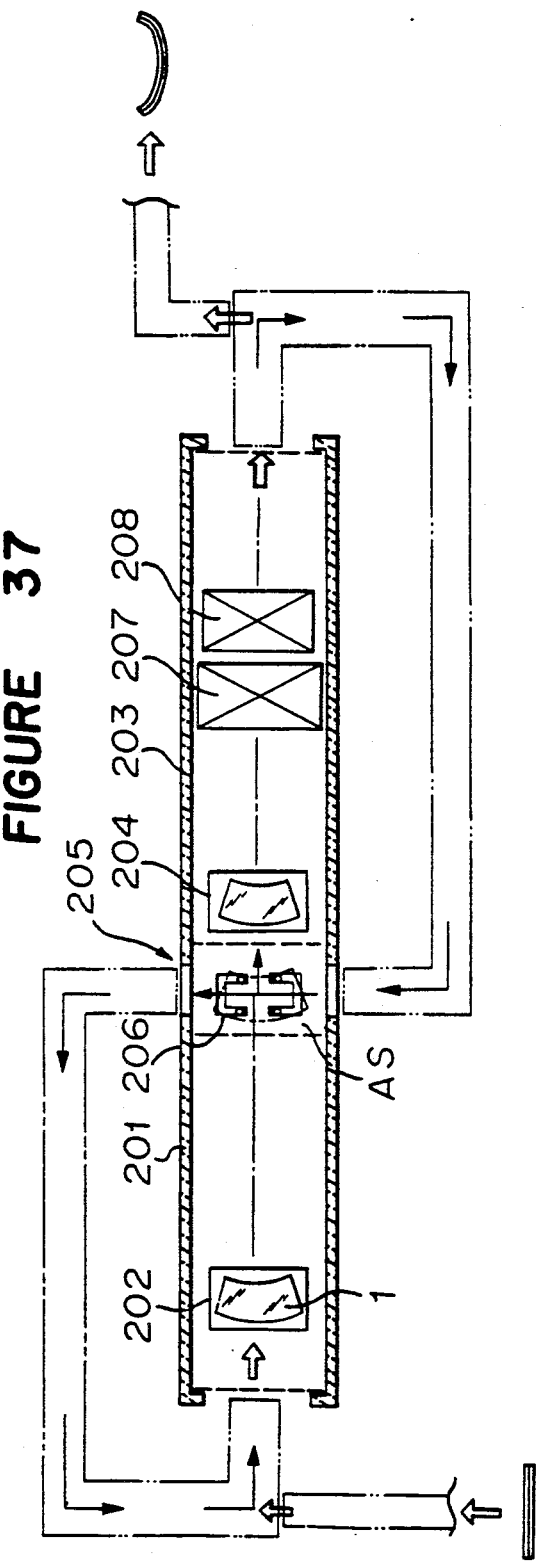
FIG. 37 is a diagram showing another embodiment of the apparatus for bending glass plates for a laminated glass according to the present invention.

FIG. 37 is a diagram in a form of model showing another embodiment of the bend-shaping apparatus for bending glass plates for a laminated glass.

The basic construction of the bending apparatus is similar to the previously mentioned embodiment provided that the provisional bending furnace 201 and the regular bending furnace 203 are arranged linearly through the transferring furnace 205, circulating passages for circulating the provisional bending mold 202 in the provisional bending furnace 201 and the regular bending mold 204 in the regular bending furnace 203 cross at the transferring stage AS in the transferring furnace 205, and a transferring means 206 having a different construction from the previously mentions embodiment is installed in the transferring stage AS.

Figure 38:
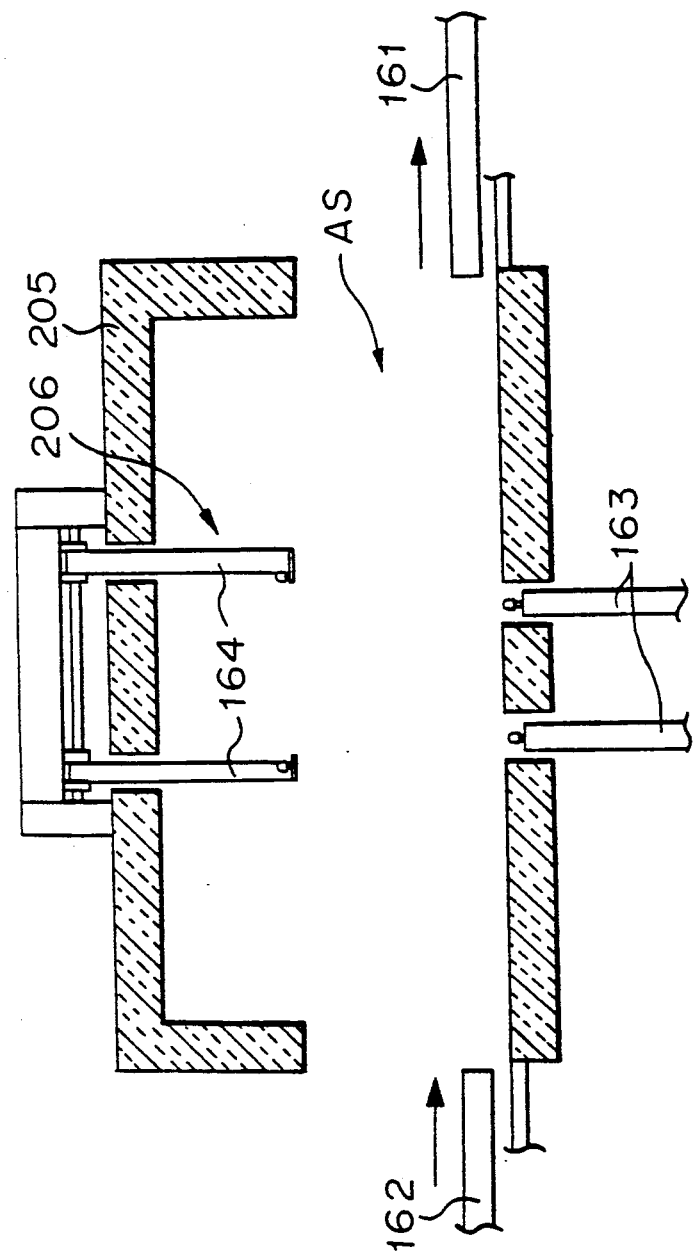
FIG. 38 is a diagram showing an embodiment of the transferring means used for the embodiment as shown in FIG. 37.

As shown in FIG. 38, the transferring means 206 comprises a first position-determining moving table 161 which determines the position of the provisional bending mold 202 at the transferring stage AS and removes the provisional bending mold 202 toward the circulating passage, a second position-determining moving table 162 which determines the position of the regular bending mold 204 at the transferring stage when the provisional bending mold 202 is removed from the transferring stage AS, and which is retractable to the original position when the setting operation for the glass plates 1 is finished, a raising and holding means 163 disposed in the lower portion of the transferring stage AS to raise and hold the glass plates, and a suspending and holding means 164 disposed in the upper portion of the transferring stage AS to suspend and hold the raised glass plates and held by the raising and holding means 163.

The same reference numerals as in the embodiment as shown in FIGS. 10–37 are used in this embodiment, and therefore, description of these parts is omitted.

The transferring operation uniquely performed by the bend-shaping apparatus for bending the glass plates for a laminated glass according to the present invention will be described.

Figure 39:
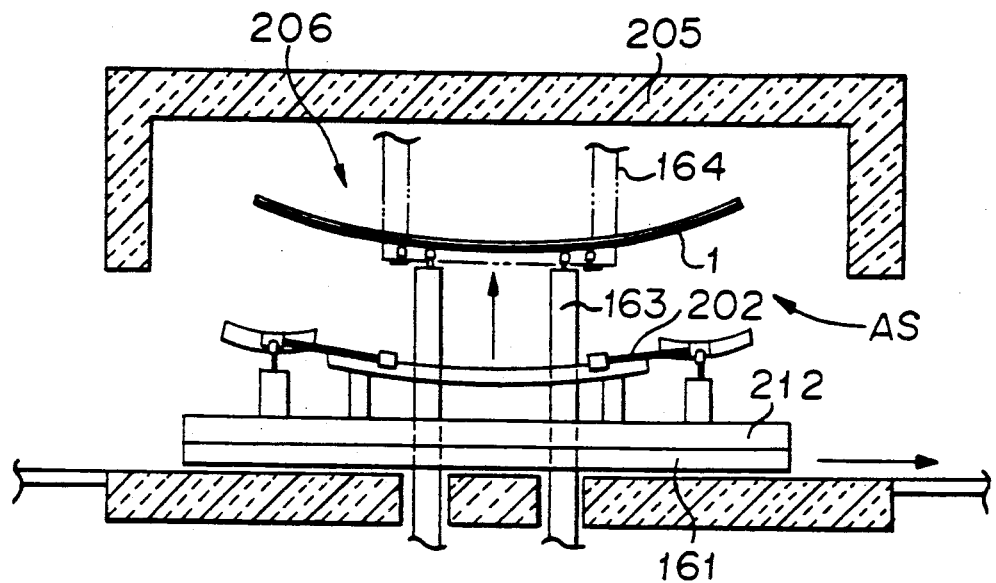
FIGS. 39 and 40 are respectively diagrams showing the transferring process as in FIGS. 38.

The two overlapping glass plates 1 provisional shaped in the provisional bending furnace 201 are transferred with the provisional bending mold 202 to the transferring stage AS as shown in FIG. 39. At the transferring stage AS, the position of the provisional bending mold 202 is determined by the first position-determining table 161, and then, the two overlapping glass plates 1 are raised and held by the raising and holding means 163. Thereafter, the suspending and holding means 164 suspends and holds the glass plates 1, and then, the raising and holding means 163 descends to its original position.

Figure 40:
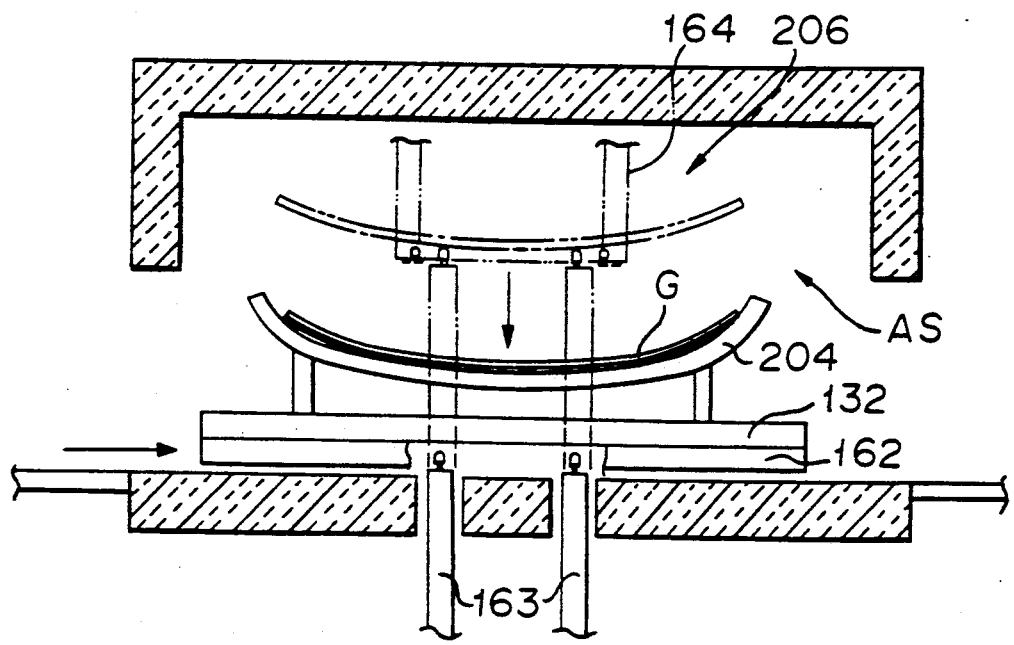

Then, as shown in FIG. 40, the first position-determining table 161 is moved to remove the provisional bending mold 202 from the transferring stage AS, and the second position-determining table 162 carries the regular bending mold 204 to the transferring stage AS where the position of the regular bending mold 204 is determined. In this state, the raising and holding means 163 is again elevated, and the glass plates 1 held by the suspending and holding means 164 are raised and held and thereafter, descend. Then, the glass plates raised and held by the raising and holding means 163 are set for position determination on the regular bending mold 204. And then, the second position-determining table 164 is returned to its original position, and the regular bending mold 204 is transferred to the regular bending furnace 203 along with the base truck 232. In this embodiment, the position-aligning means 260 as in the previously mentioned embodiment becomes unnecessary because it is unnecessary to move the glass plates 1 in the horizontal direction. As described above, in accordance with the bend-shaping method for a laminated glass and the apparatus for bend-shaping glass plates for the laminated glass according to the present invention, glass plates are heated to a glass softening temperature to provisionally shape the glass plates so that they substantially meet a bending mold by force of their deadweight and then, an incompletely shaped portion of the glass plates is corrected by locally pressing the glass plates. Accordingly, side portions of the glass plates can be deeply bent and shaped accurately even though the degree of curvature in the portion of the glass plates to be deeply bent is large. Further, flexibility in shape of the glass plates to be laminated can be increased and the glass plates can be strengthened by effectively cooling the peripheral edge portion of the glass plates by placing the peripheral edge in a non-contacting state. In an embodiment of the present invention wherein taper rings are provided adjacent to the outer parts of the bending mold so that both edge portions of the overlapping glass plates placed on the bending mold are received by the taper rings, the glass plates having both side edges with a desired radius of curvature can be bend-shaped by locally heating a portion of the glass plates to be deeply bent of the glass plates at a higher temperature than the other portion by means of a local heating heater to bend them by their own deadweight, and then, by pressing the locally heated portion from the top by means of a pressing means. For instance, in the past, it has been difficult to form two overlapping glass plates by the bend-shaping process so that a side edge portion has a radius of curvature of 600–10,000 mmR in the case where the glass plates are subjected to deadweight bending without a pressing operation. However, it is possible to form the side edge portion having a radius of curvature about 80–200 mmR by the pressing operation in accordance with the present invention. Further, use of the taper ring to support the peripheral edge portion of the overlapping glass plates at the time of pressing eliminates traces imparted thereto by the bending mold which form on the portion of the plates where contact between the lower surface of the lower glass plate and the shaping surface of the bending mold occurs when the glass plates project about 4 mm–10 mm from the end portion of the bending mold.

In the conventional technique, a complicated process called an oversize processing method has been required in order to deeply bend the glass plates so that the laminated glass has a desired radius of curvature. In accordance with the present invention, however, glass plates having a desired radius of curvature at the peripheral portion are obtainable by previously cutting a glass sheet to the dimensions corresponding to the shape of a laminated glass as the final product. This makes the production of a laminated glass having a desired shape easy and reduces the manufacturing cost.

In another embodiment of the present invention, wherein a printed layer of colored ceramic color frit is formed on the deeply bent portion of the glass plates by a pressing means, traces which form on the glass plate by the contact of the glass with the pressing means, they occur, becomes inconspicuous because the colored zone is formed by baking the colored ceramic color frit. Accordingly, an undesirable optical defect does not occur.

At the gradual cooling stage, the peripheral portion of the glass plates can be cooled by means of the raising and holding means so that the portion except the peripheral portion of the glass plates is supported by the raising and holding means and the peripheral edge portion is separated from the bending mold. Accordingly, a requisite peripheral-portion-strengthening treatment can be effectively applied to the peripheral edge portion of the two overlapping glass plates having a relatively thin wall thickness. In this case, when the peripheral portion of the glass plates is locally heated, a larger compression stress can be given.

Further, when the glass plates are transferred into the gradual cooling stage at a quick transferring rate, a larger compressive stress can be applied not only to the upper side but also the lower side so that the peripheral edge portion has a desired strength.

When the glass plates for a laminated glass are deeply bent, different bending molds are used: namely, a bending mold for provisional shaping by a deadweight bending method in the provisional bending furnace and a bending mold for regular shaping by a pressing operation in the regular bending furnace. Accordingly, it is unnecessary to clamp the movable molds of the deadweight bending mold for the regular shaping operation. Accordingly, labor time for clamping can be omitted. A large scale production system can be easily realized without loss of production rate when the two overlapping glass plates are to be bend-shaped.

The glass plates can be transferred from the provisional bending mold to the regular bending mold without crossing production lines. Accordingly, transferring systems can be separately constructed without considering the interference between the provisional bending mold and the regular bending mold.

The transferring operation of the glass plates from the provisional bending mold to the regular bending mold can be carried out at the same operating stage. Accordingly, it is unnecessary to adjust the position of the glass plates at the regular bending mold when they are transferred onto the regular bending mold, whereby the position-adjusting operation can be omitted.

When the side portions of the glass plates are pushed from the direction substantially perpendicular to the bend-shaping surface corresponding to the portion of the glass plates to be deeply bent in the regular bending process, occurrence of wrinkles at the deep-bend portion of the glass plates can be effectively reduced.

In accordance with the present invention, a large scale production system for shaping the deep-bend portion of the glass plates can be effectively realized because a number of bending molds can be continuously transferred with desired time intervals in each of the heating furnaces.

In accordance with the present invention, it is unnecessay to heat the pressing means together with the glass plates and the regular bending mold in the regular bending furnace because the pressing mean is placed at the pressing stage. Accordingly, thermal efficiency in the regular bending furnace can be improved as well as deterioration of the pressing means by heat can be suppressed which thereby improves the durability. Further, when a number of bending molds are used to perform a large scale production of the glass plates, it is unnecessary to provide the pressing means for each transferring means for transferring the bending molds. Accordingly, the number of structural elements of the apparatus for bend-shaping glass plates can be reduced thereby simplifying the overall structure of the apparatus.

What is claimed is:

1. A method of bending and strengthening glass plates for a laminated glass wherein side portions of two overlapping glass plates are simultaneously subjected to deep-bending, said method comprising:

a provisional shaping step to shape by heating said two overlapping glass plates placed on a deadweight bending mold having a shaping surface by elevating the temperature to a temperature capable of bending glass and by locally heating side portions of said two overlapping glass plates to be deeply bent at a higher temperature in a heating/pressing stage so that said two overlapping glass plates are provisionally shaped by their own deadweight into a shape substantially corresponding to the shape of the shaping surface of said bending mold;

a pressing step of pressing a portion of said two overlapping glass plates to be deeply bent from the top by a pressing means after said provisional shaping step in said heating/pressing stage;

a separating step of separating said two overlapping glass plates from said bending mold by forcing upwards the portion of said two overlapping glass plates other than the peripheral portion of said glass plates to thereby cool the peripheral portion of the glass plates in a peripheral portion strengthening stage; and a cooling step of cooling said two overlapping glass plates to atmospheric temperature.

2. The method of bending glass plates for a laminated glass according to claim 1, wherein said deadweight bending mold has taper rings attached thereto along its edge portions each having a shaping surface at its upper portion at the position corresponding to the periphery of said overlapping glass plates to be deeply bent, wherein said shaping surface of said taper rings has a shape corresponding to that of said peripheral portion of said overlapping glass plates obtained after bending.

3. The method of bending glass plates for a laminated glass according to claim 1, wherein
one of said overlapping glass plates has a printed ceramic color frit layer on it supper surface at the circumferential portion of the side of the glass plate which is placed on the other glass plate; and
said ceramic color frit layer being firmly formed to the glass plate by baking in said provisional shaping step.

4. The method of bending glass plates for a laminated glass according to claim 1, wherein after said separating operation, said cooling step comprises quickly placing said two overlapping glass plates in a cooling stage in which they are gradually cooled to a temperature capable or producing a plane compressive stress at at least the peripheral portion of the glass plates while the glass plates are lifted from said bending mold to thereby strengthen the periphery of the overlapping glass plates.

5. The method of bending glass plates for a laminated glass according to claim 4, wherein before said separated step, the peripheral portion of said glass plates is locally heated at said peripheral portion strengthening stage.

6. A method of bending glass plates for a laminated glass which comprises:
provisionally shaping two overlapping glass plates on a splittable type deadweight provisional bending mold with fixed and movable mold portions each having a shaping surface by heating said glass plates to a temperature capable of bending glass and by locally heating the side portions of said glass plates to be deeply bent at higher temperature to thereby bend said glass plates by their own deadweight into a shape substantially corresponding to the shape of said shaping surfaces of the provisional bending mold;

moving said two overlapping glass plates from said splittable type bending mold to a non-splittable type regular bending mold;

pressing portions of the overlapping glass plates which are to be deeply bent from the top by a pressing means;

separating said two overlapping glass plates from said bending mold by pushing up the portion of the glass plates other than the peripheral portion of said overlapping glass plates to thereby cool the peripheral portion of the glass plates, and cooling said two overlapping glass plates to atmospheric temperature.

7. The method of bending glass plates for a laminated glass according to claim 6, wherein said step of moving said two overlapping glass plates from said provisional bending mold to said regular bending mold comprises:
a step of raising said provisional shaped two overlapping glass plates from said provisional bending mold,
a moving step of moving said raised overlapping glass plates in a substantially horizontal direction,
a position-aligning step to effect position-alignment for said two overlapping glass plates on said regular bending mold, during the movement of said glass plates, and
a placing step to place said two overlapping glass plates on said regular bending mold.

8. The method of bending glass plates for a laminated glass according to claim 6, wherein said step of moving said two overlapping glass plates from said provisional bending mold to said regular bending mold comprises:
a raising and holding step to temporarily raise and hold said provisionally shaped two overlapping glass plates over said provisional bending mold,
a provisional bending mold removing step to move to the outside said provisional bending mold from a working stage where said raising and holding step is carried out,
a regular bending mold setting step to move said regular bending mold and fix it at a predetermined position in said working stage after said provisional bending mold has been moved from a working stage to the outside, and
a placing step to place said two overlapping glass plates on said regular bending mold after said regular bending mold setting step has been finished.

9. An apparatus for bending glass plates for a laminated glass wherein said side portions of two overlapping glass plates are simultaneously subjected to deep-bending, said apparatus comprising:
a heating furnace for heating said glass plates to a temperature capable of bending glass;
a deadweight bending mold transferable through said heating furnace, which is provided with a first bend-shaping surface which corresponds to an intermediate curved portion of said glass plates and a second bend-shaping surface which corresponds to a side portion of said glass plates which is to be deeply bent;
a pressing means which is arranged in a pressing stage in said heating furnace and which has a pressing member having a curved surface which corresponds to a side portion of said glass plates to be deeply bent so that said pressing member forces said side portion of the glass plates into said bending mold in said pressing stage; and
a raising means arranged inside said bending mold which elevates the glass plates after the deep bending operation.

10. The apparatus for bending glass plates according to claim 9, wherein a local heating means is arranged between said pressing means and said raising means for deeply bending so that the peripheral portion of said glass plates is locally heated.

11. The apparatus for bending and strengthening glass plates according to claim 9, wherein:
said apparatus further comprises a cooling stage arranged downstream of the area in which the raising means is operated and providing a temperature which is lower than atmospheric temperature of the area in which the raising means is operated in order to gradually cool said glass plates; and
said apparatus further comprising a quick drawing means in or near the area in which the raising means is operated in the bending mold, said quick drawing means quickly withdrawing said glass plates on the bending mold from the area in which the raising means is operated in the bending mold into said cooling stage.

12. The apparatus for bending glass plates according to claim 9, wherein a local heating means is arranged behind said pressing means for deeply bending so that the peripheral portion of said glass plates is locally heated; and
said apparatus further comprises a quick drawing means in or near the area in which the raising means is operated in the bending mold for quickly withdrawing said glass plates on the bending mold into said gradual cooling stage.

13. An apparatus for bending glass plates for a laminated glass wherein side portions of two overlapping glass plates are simultaneously subjected to deep-bending, said apparatus comprising:
a first heating furnace for provisionally bending the glass plates which heat said glass plates to a temperature capable of bending glass;
a provisional bending mold transferable through said first heating furnace, which is provided with a fixed mold having a bend-shaping surface which corresponds to an intermediate curved portion of said glass plates and a movable mold having a bend-shaping surface which corresponds to the portion of the glass plates which is to be deeply bent, said movable mold being movable so that it comes into alignment with an end of said fixed mold by its deadweight when said two overlapping glass plates held on said fixed and movable molds are heated to said temperature;
a second heating furnace for regularly bending said provisionally bent glass plates which heats said glass plates to a temperature capable of bending glass;
a regular bending mold transferable through said second heating furnace and having a bend-shaping surface which corresponds to the portion of said glass plates to be bent;
a transferring furnace which is in communication with both said first and second heating furnaces and which provides a temperature sufficient to maintain the shape of said glass plates which have been provisionally shaped in said first heating furnace;
a transferring means arranged in said transferring furnace which transfers said provisionally shaped glass plates from said provisional bending mold to said regular bending mold;
a pressing means which is arranged in a pressing stage in said second heating furnace and which has a pressing member having a curved surface which corresponds to the portion of said glass plates to be deeply bent so that said pressing member forces said deeply bent portion of the glass plates against said regular bending mold in said pressing stage; and a raising means arranged inside said regular bending mold which elevates said glass plates after they are deeply bent.

14. The apparatus for bending glass plates according to claim 13, wherein a number of provisional bending molds and regular bending molds are respectively circulated in said first and second heating furnaces.

15. The apparatus for bending glass plates according to claim 13, wherein said transferring means comprises:

a first raising and holding means for elevating said two overlapping glass plates over said provisional bending mold at the entrance to said transferring furnace;

a transferring means to hold from the top said two overlapping glass plates supported by said first raising and holding means which provides transport of the overlapping glass plates through the transfer furnace;

a position-aligning means for effective alignment of said two overlapping glass plates on said regular bending mold during the transportation of the glass plates by said transferring means; and a second raising and holding means for supporting from the bottom of said glass plates in said transferring furnace and for placing the glass plates on said regular bending mold.

* * * * *